(12) United States Patent
White

(10) Patent No.: US 12,046,151 B2
(45) Date of Patent: Jul. 23, 2024

(54) WEARABLE TRAINING AND SIMULATION DEVICE AND USES THEREOF

(71) Applicant: Edward Via College of Osteopathic Medicine, Blacksburg, VA (US)

(72) Inventor: Jeremy Jason White, Opelika, AL (US)

(73) Assignee: EDWARD VIA COLLEGE OF OSTEOPATHIC MEDICINE, Blacksburg, VA (US)

( * ) Notice: Subject to any disclaimer, the term of this patent is extended or adjusted under 35 U.S.C. 154(b) by 641 days.

(21) Appl. No.: 17/100,149

(22) Filed: Nov. 20, 2020

(65) Prior Publication Data

US 2021/0150937 A1 May 20, 2021

Related U.S. Application Data

(60) Provisional application No. 62/937,926, filed on Nov. 20, 2019.

(51) Int. Cl.
*G09B 23/30* (2006.01)
*G09B 23/28* (2006.01)

(52) U.S. Cl.
CPC .......... *G09B 23/30* (2013.01); *G09B 23/285* (2013.01)

(58) Field of Classification Search
CPC ....... G09B 23/30; G09B 23/285; G09B 23/28
USPC ........................................................ 434/269
See application file for complete search history.

(56) References Cited

U.S. PATENT DOCUMENTS

| | | |
|---|---|---|
| 4,789,340 A | 12/1988 | Zikria |
| 5,620,326 A | 4/1997 | Younker |
| 5,951,301 A | 9/1999 | Younker |
| 6,780,016 B1 | 8/2004 | Toly |
| 7,306,465 B2 | 12/2007 | White |
| 7,566,328 B2 | 7/2009 | Hooper |
| 7,575,434 B2 | 8/2009 | Palakodeti |
| 7,887,330 B2 | 2/2011 | King |
| 8,221,129 B2 | 7/2012 | Parry et al. |
| 8,342,852 B2 | 1/2013 | King |
| 8,403,675 B2 | 3/2013 | Stoianovici et al. |
| 8,491,309 B2 | 7/2013 | Parry et al. |
| 8,840,403 B2 | 9/2014 | Segall |
| 8,944,825 B2 | 2/2015 | Reid-Searl et al. |
| 9,218,753 B2 | 12/2015 | Hoke et al. |
| 9,280,917 B2 | 3/2016 | Parry, Jr. et al. |
| 9,336,693 B2 | 5/2016 | Segall |
| 9,342,996 B2 | 5/2016 | King |
| 9,472,123 B2 | 10/2016 | Trotta et al. |
| 9,548,002 B2 | 1/2017 | Black et al. |
| 9,881,522 B2 | 1/2018 | Sakezles et al. |
| 9,916,774 B2 | 3/2018 | Segall |
| 10,026,337 B2 | 7/2018 | Black et al. |
| 10,115,322 B2 | 10/2018 | Parry, Jr. et al. |
| 10,198,966 B2 | 2/2019 | Wachli et al. |

(Continued)

FOREIGN PATENT DOCUMENTS

WO 2018/075588 A1 4/2018
WO 2018/126169 A1 7/2018

*Primary Examiner* — Kurt Fernstrom
(74) *Attorney, Agent, or Firm* — Carin R. Miller, Esq.; Johnson, Marcou, Isaacs & Nix, LLC

(57) ABSTRACT

Described and demonstrated herein are embodiments of a self-supporting wearable device that can be used for medical training and simulations. Also described herein are methods of using the wearable device described herein.

20 Claims, 22 Drawing Sheets

(56) References Cited

U.S. PATENT DOCUMENTS

| | | |
|---|---|---|
| 10,217,380 B2 | 2/2019 | Parry et al. |
| 10,347,157 B2 | 7/2019 | King |
| 10,360,818 B2 | 7/2019 | Segall |
| 10,424,226 B2 | 9/2019 | Sakezles et al. |
| 10,438,510 B2 | 10/2019 | Trotta et al. |
| 10,535,282 B2 | 1/2020 | Parry et al. |
| 10,586,470 B2 | 3/2020 | Parry et al. |
| 10,657,845 B2 | 5/2020 | Black et al. |
| 2004/0234933 A1 | 11/2004 | Dawson et al. |
| 2007/0292829 A1 | 12/2007 | King et al. |
| 2012/0034587 A1* | 2/2012 | Toly ............... G09B 23/30 434/267 |
| 2015/0086958 A1 | 3/2015 | Lewis |
| 2016/0071437 A1 | 3/2016 | Hoke et al. |
| 2017/0069231 A1 | 3/2017 | Trotta et al. |
| 2018/0158373 A1 | 6/2018 | Hendrickson et al. |
| 2018/0158376 A1 | 6/2018 | Tessier et al. |
| 2018/0190155 A1 | 7/2018 | Segall |
| 2018/0322807 A1 | 11/2018 | Black et al. |
| 2018/0357930 A1 | 12/2018 | Kuwabara et al. |
| 2019/0122583 A1 | 4/2019 | Wachli et al. |
| 2019/0156704 A1 | 5/2019 | Parry et al. |
| 2019/0287422 A1 | 9/2019 | Parry et al. |
| 2019/0311654 A1* | 10/2019 | Segall ............... G09B 23/28 |

* cited by examiner

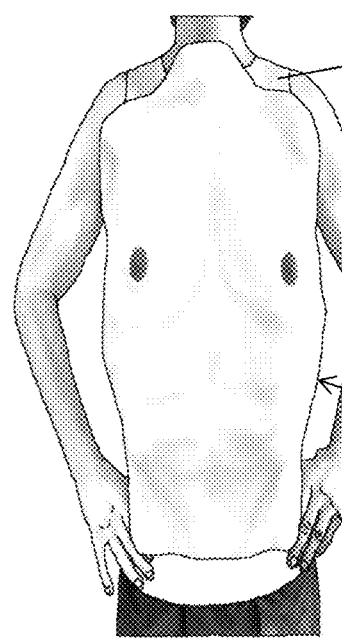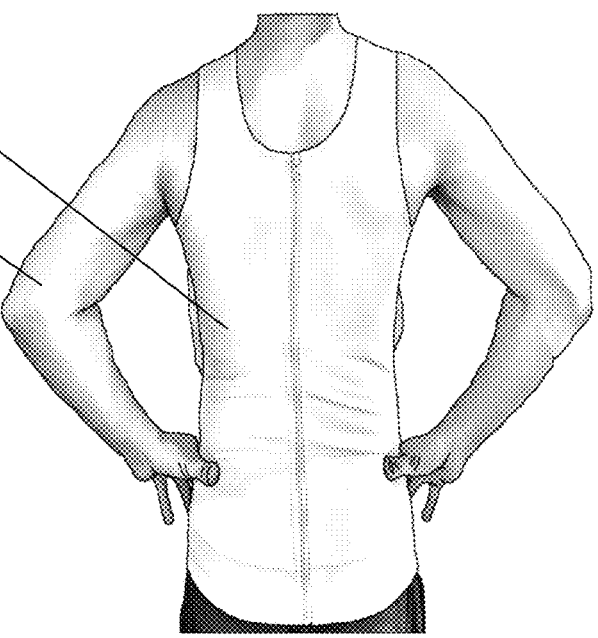
FIG. 5A  FIG. 5B
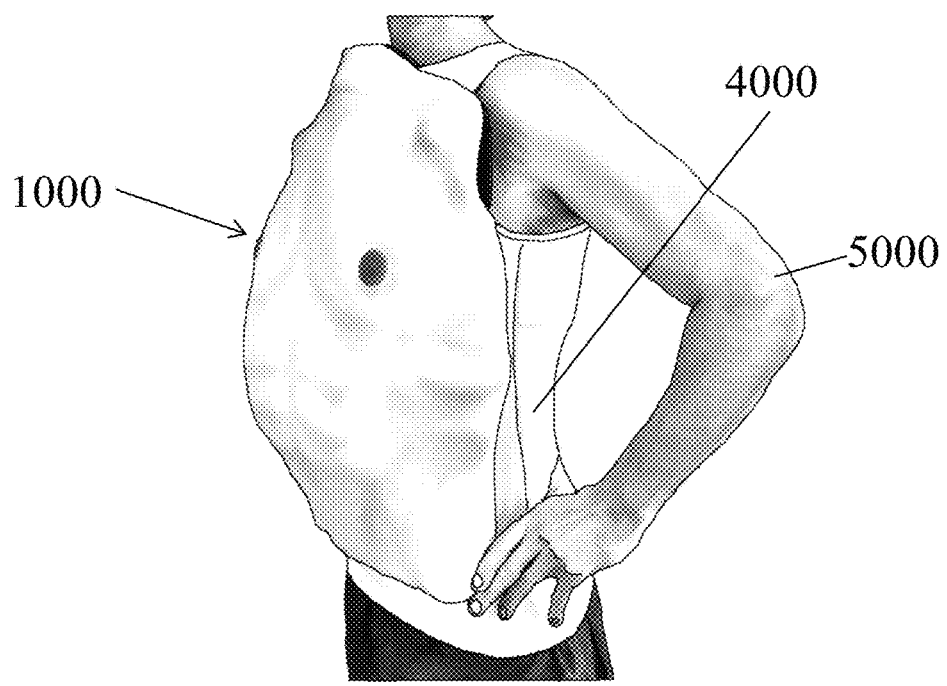
FIG. 5C

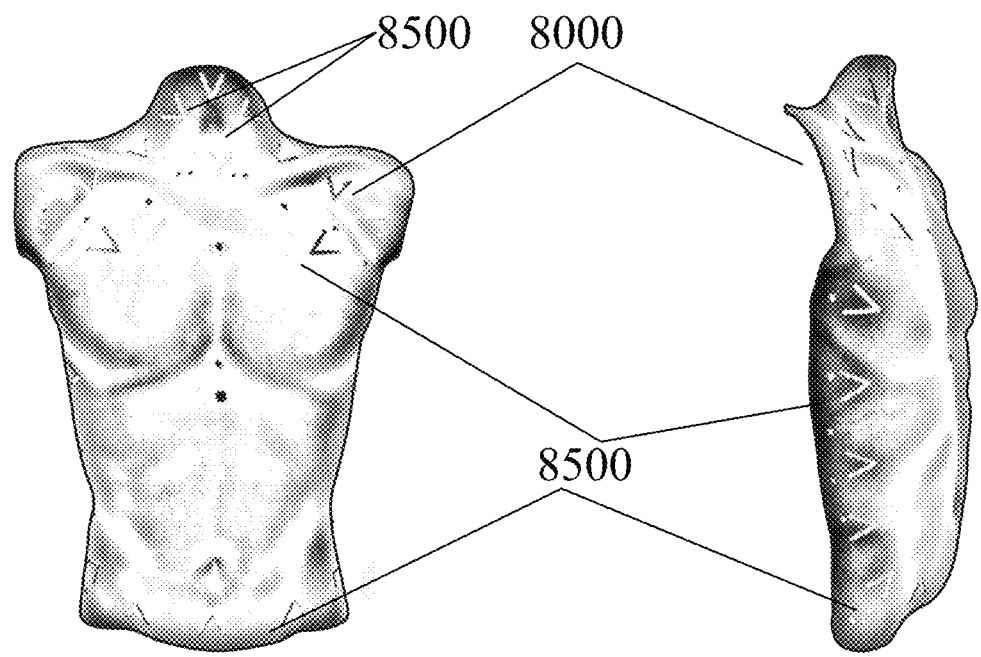
FIG. 16A  FIG. 16B
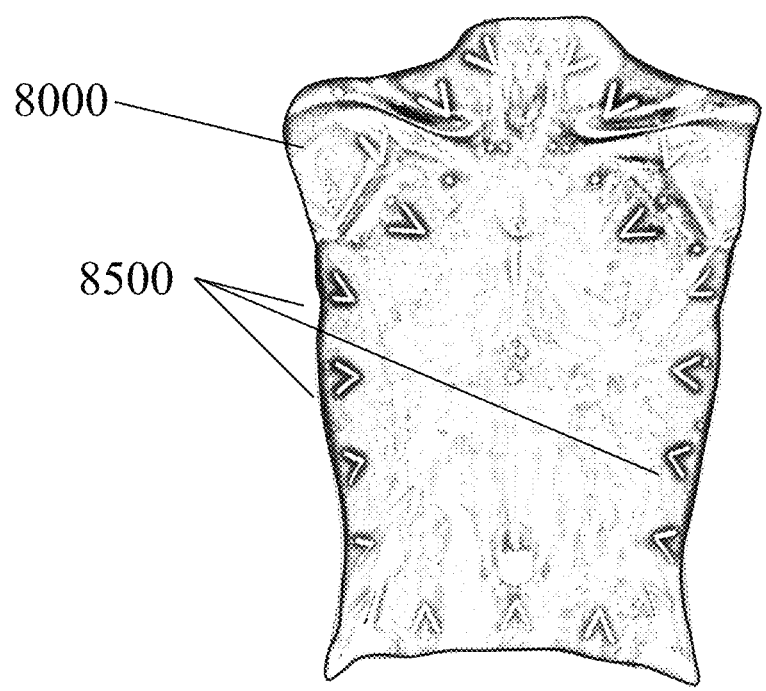
FIG. 16C

FIG. 24
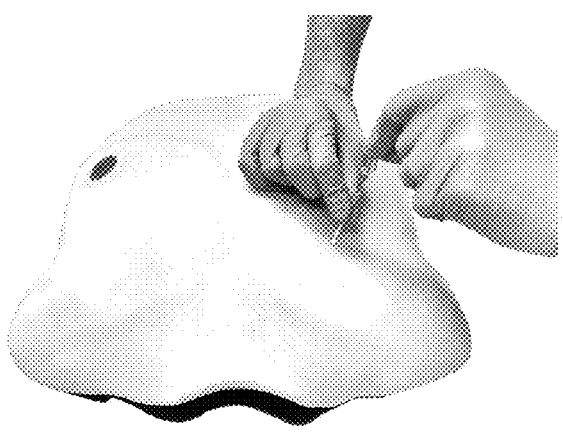 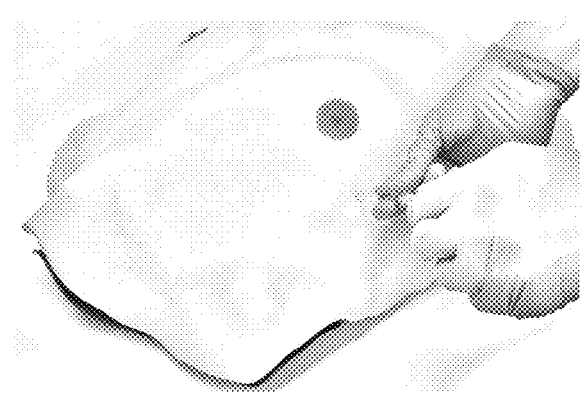
FIG. 25A  FIG. 25B

WEARABLE TRAINING AND SIMULATION DEVICE AND USES THEREOF

CROSS-REFERENCE TO RELATED APPLICATIONS

This application claims the benefit of and priority to co-pending U.S. Provisional Patent Application No. 62/937,926, filed on Nov. 20, 2019 entitled WEARABLE TRAINING AND SIMULATION DEVICE AND USES THEREOF," the contents of which is incorporated by reference herein in its entirety.

TECHNICAL FIELD

The subject matter disclosed herein is generally directed to training devices for medical treatments, simulations, and other purposes.

BACKGROUND

Healthcare students and providers need proper training tools to be able to render effective emergency, combat, and disaster medical responses to various traumatic injuries. Proper medical training for these critical scenarios helps provide the greatest good for the greatest number of victims and ultimately save lives.

Whether it be simple or complex medical procedures, the use of procedural skills trainers and simulators is a key part of this education process. To optimize the fidelity, procedural skills trainers need to be flexible in their capabilities depending on the scenario and simulation. With this in mind, there exists a need for improved skills trainers.

Citation or identification of any document in this application is not an admission that such a document is available as prior art to the present invention.

SUMMARY

Described in certain example embodiments herein are self-supporting wearable devices comprising an internal portion comprising one or more formed layers, wherein each of the one or more formed layers comprises a material independently selected from the group consisting of: a plastic, a resin, a silicone rubber, or a composite material, wherein the one or more formed layers are formed in the shape of a ventral portion of a human torso, wherein the internal portion is configured to contact a torso or a person or a manikin when optionally worn by the person or the manikin, a middle portion comprising one or more formed layers, wherein each of the one or more formed layers comprises a material independently selected from the group of: a plastic, a resin, a silicone rubber, a polyurethane foam, or a composite material, wherein the one or more formed layers are formed in the shape of a ventral portion of a human torso; one or more simulated anatomical parts of a human torso coupled to one of the one or more formed layers of the middle portion; and an outer simulated skin, wherein the outer simulated skin is stretched over the middle portion such that the outer simulated skin assumes the shape formed from the middle portion; wherein the middle portion is sandwiched between and coupled to the outer simulated skin and the internal portion and wherein the internal portion is configured to support the middle portion and the external portion such that the wearable device is self-supporting when not optionally worn by the person or the manikin.

In certain example embodiments, the wearable self-supporting device further comprises one or more fastening members configured to couple the wearable self-supporting device to the torso of a user when optionally worn during use, wherein the one or more fastening members are coupled to the internal portion, the middle portion, the outer simulated skin, or a combination thereof.

In certain example embodiments, the simulated skin comprises a silicone rubber embedded fabric.

In certain example embodiments, the simulated skin comprises a plurality of layers, wherein at least one layer comprises a fabric or a silicone rubber embedded fabric.

In certain example embodiments, at least one layer comprises a fabric and at least one other layer comprises a silicone rubber, wherein the at least one layer comprising fabric and the at least one layer comprising silicone are attached to each other.

In certain example embodiments, each additional layer of the plurality of layers comprises a material independently selected from the group consisting of a polyurethane foam, silicone rubber, or a combination thereof.

In certain example embodiments, the plurality of layers simulate human epidermal tissue, human dermal tissue, subcutaneous tissue, adipose tissue, muscle tissue, or a combination thereof.

In certain example embodiments, the outer simulated skin is repairable.

In certain example embodiments, the one or more simulated anatomical parts are non-organ simulated anatomical parts.

In certain example embodiments, the one or more simulated anatomical parts are selected from a larynx, one or more humeri, one or more clavicles, sternum, one or more ribs, connective tissue, and a combination thereof.

In certain example embodiments, at least one of the one or more simulated anatomical parts are a simulated pericardium.

In certain example embodiments, the total weight of the wearable self-supporting device is less than about 10 lbs.

In certain example embodiments, the middle portion comprises 1-10 formed layers.

In certain example embodiments, the internal portion comprises 1-10 formed layers.

In certain example embodiments, the wearable self-supporting device is configured to cover a neck, one or more shoulders, a chest, an abdomen region, or a combination thereof of an optional user.

Described in certain example embodiments herein are methods of using the wearable self-supporting device described herein comprising performing a simulated medical procedure on the wearable self-supporting device.

In certain example embodiments, the method further comprises securing the device to a torso of a human or manikin or positioning the device on a surface with the outer simulated skin in facing away from the surface.

In certain example embodiments, the medical procedure is a cricothyrotomy, intraosseous cannulation of bilateral humeral heads, intraosseous cannulation of the sternum, intramuscular injections, subcutaneous injections, chest tube thoracostomy at multiple bilateral rib interspaces, laceration repair, abscess incision and drainage, hematoma evacuation, foreign body and impalement stabilization and removal, puncture/abrasions/avulsion wound care, chest needle decompression at multiple bilateral rib interspaces, pericardiocentesis, paracentesis, escharotomy, chest port access and care, or a combination thereof.

In certain example embodiments, performing a simulated medical procedure comprises applying a pressure one or more times in one or more locations on the self-supporting wearable device.

In certain example embodiments, performing a simulated medical procedure comprises making one or more incisions through at least one or more layers of the outer simulated skin.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

FIG. 3 shows exemplary medical procedures that can be performed on the self-supporting wearable device either as a tabletop trainer or when worn by a user or manikin.

FIGS. 5A-5C—A front view (FIG. 5A), back view (FIG. 5B), and perspective view (FIG. 5C) of an exemplary embodiment of the self-supporting wearable device described herein being optionally worn by a user and secured to the user by an exemplary fastening member (e.g. a shirt or vest) attached to one or more portions of the self-supporting wearable device.

FIG. 7 does not show the outer simulated skin that can be stretched over the middle portion.

FIGS. 16A-16C—Show a front view (FIG. 16A), side view (FIG. 16B), and back view (FIG. 16C) of an exemplary embodiment of a self-supporting wearable device described herein that showing a formed layer of the middle portion of the device that can be coupled to the external portion and optional simulated anatomical parts.

FIG. 24—An exemplary embodiment of a method of using the self-supporting wearable device during performance of an intraosseous cannulation of the simulated sternum on the device, which can be performed when the device is worn by a user or manikin or placed on a surface.

FIGS. 25A-25B—An exemplary embodiment of a method of using the self-supporting wearable device during performance of needle decompression of the anterior right chest (FIG. 25A) and lateral right chest (FIG. 25B), which can be performed at one or more bilateral rib interspaces on the self-supporting wearable device when the device is worn by a user or manikin or placed on a surface.

Figure 1:
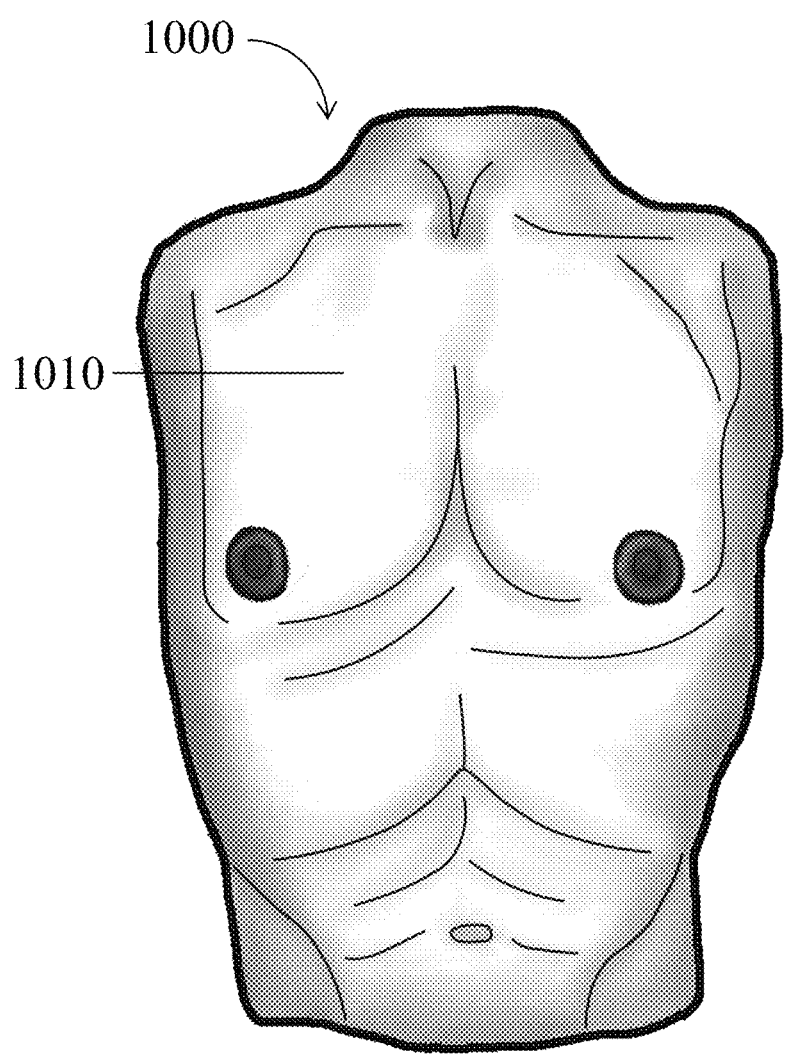
FIG. 1—A front view of an exemplary embodiment of a self-supporting wearable device specifically showing an external portion (i.e. an outer simulated skin), which can be configured to simulate aspects of a human torso.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

General Definitions

Unless defined otherwise, technical and scientific terms used herein have the same meaning as commonly understood by one of ordinary skill in the art to which this disclosure pertains.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosed invention. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

The recitation of numerical ranges by endpoints includes all numbers and fractions subsumed within the respective ranges, as well as the recited endpoints.

As used herein, a "biological sample" may contain whole cells and/or live cells and/or cell debris. The biological sample may contain (or be derived from) a "bodily fluid". The present invention encompasses embodiments wherein the bodily fluid is selected from amniotic fluid, aqueous humour, vitreous humour, bile, blood serum, breast milk, cerebrospinal fluid, cerumen (earwax), chyle, chyme, endolymph, perilymph, exudates, feces, female ejaculate, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, urine, vaginal secretion, vomit and mixtures of one or more thereof. Biological samples include cell cultures, bodily fluids, cell cultures from bodily fluids. Bodily fluids may be obtained from a mammal organism, for example by puncture, or other collecting or sampling procedures.

The terms "subject," "individual," and "patient" are used interchangeably herein to refer to a vertebrate, preferably a mammal, more preferably a human. Mammals include, but are not limited to, murines, simians, humans, farm animals, sport animals, and pets. Tissues, cells and their progeny of a biological entity obtained in vivo or cultured in vitro are also encompassed.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention. For example, in the appended claims, any of the claimed embodiments can be used in any combination.

As used herein, the term "fabric" is to be understood in its widest meaning. The term "fabric" may be used for all structures composed of fibers which have been manufactured according to a surface-forming method. Fabrics include materials where one or more different types of yarns, threads, filaments, or fibers that have been woven, knitted, felted, wrapped, spun, co-mingled, coated, coextruded, braided, entangled, applied or otherwise assembled into a desired material. Generally, the fabric has a structure which comprises a series of meshes or openings and filament bundles which define the mesh boundaries, such as woven, knitted, knotted, interwoven or tufted structures. Without limitations, the term "fabric" is intended to include woven fabrics, yarn sheets, knitted fabrics and non-woven fabrics. Further, the fabrics may be constructed from a combination of fibers, threads or yarns. Fabrics comprising different fibers, threads or yarns are also referred to as fabric blends herein. A knitted fabric may be flat knit, circular knit, warp knit, narrow elastic, and lace. A woven fabric may be of any construction, for example sateen, twill, plain weave, oxford weave, basket weave, and narrow elastic and the like.

As used herein, the term "fiber" refers to refers to any slender, elongated structure that can be carded, combed, or otherwise formed into a thread or filament. A fiber can comprise a natural material (e.g., cotton, linen or wool) or an artificial material (e.g., nylon, polyester). A fiber is a material in which the length to diameter ratio is greater than about 10. Fiber is typically classified according to its fineness. Fiber is generally defined as having a fiber fineness greater than about 15 denier, usually greater than about 30 denier. Fine denier fiber generally refers to a fiber having a fineness less than about 15 denier. Examples of fibers include "staple fibers", a term that is well-known in the textile art. A reference to "fiber" of "fibers" may mean or include individual fibers or a plurality or bulk of fibers as the situation requires. A plurality of fibers may comprise fibers of different compositions or may be substantially uniform in composition. Thus, by way of illustration, a reference to "natural fiber" or "synthetic fiber" may mean and may include a single fiber of such type, or may mean any quantity or plurality of such fibers and they may be comprised in threads, felts, yarns, fabrics materials etc., all as will be apparent from the context. The fiber can be a synthetic fiber or a natural or organic fiber. As one of skill in the art is well aware, smoothness of the outer surfaces is significantly varied between different fibers. Accordingly, the outer surface of the fiber can be smooth or rough. By way of example only, manmade fibers, such as polyester fibers, usually have a smooth outer surface. In contrast, natural fibers, such as cotton, usually have a rough outer surface. One consequence of the roughness of the outer surface is that rough surfaces take more fluid to completely cover the surface per unit diameter. As used herein, "fiber" refers to any one of the various types of matter that form the basic elements of a textile and that is characterized by a flexible, macroscopically homogeneous body having a high ratio of length to width and being small in cross section, and may include one or more fibrous materials (e.g., fibers or filaments). It is understood that "fiber" includes "filaments."

All publications, published patent documents, and patent applications cited herein are hereby incorporated by reference to the same extent as though each individual publication, published patent document, or patent application was specifically and individually indicated as being incorporated by reference.

Overview

Healthcare students and providers need proper training tools to be able to render effective emergency, combat, and disaster medical responses to various traumatic injuries. Proper medical training for these critical scenarios helps provide the greatest good for the greatest number of victims and ultimately save lives. Whether it be simple or complex medical procedures, the use of procedural skills trainers and simulators is a key part of this education process. To optimize the fidelity, procedural skills trainers need to be flexible in their capabilities depending on the scenario and simulation. However, current devices are specialized for different purposes and thus fail to have sufficient flexibility to be applicable for multiple training, simulation, and other purposes.

With some of the deficiencies of current devices in mind, described herein are several exemplary embodiments of a device that can be capable of realistic simulation of a plurality of injuries and can be configured for training of multiple procedures. It is also scalable in its depiction of the injury(ies) and/or procedures. Some embodiments can allow for the addition of multiple bilateral trauma presentations based on the needs of the particular simulation or training protocol. In some embodiments, all or at least part of the device is moulagable and repairable, which can allow for rapid device preparations, adjustments, repairs, and replacements for improved usability and durability over current devices. In some embodiments, the device is configured such that it can be worn by a person for training and/or simulation or be used as a stand-alone device. In some embodiments, the device can weigh less than about 10 pounds, while still being robust enough for a plurality of medical procedures to be completed while keeping an optional wearer safe from tools used during the procedure simulations, such as from needle sticks, lacerations, punctures, or other potential sharps injuries.

Generally, the embodiments of the device described herein can be considered a hybrid training and/or simulation device that can recapitulate injuries/conditions/procedures and can fully function as both a traditional tabletop procedural skills trainer or prop as well as be worn by a person or manikin for simulation and/or training. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Wearable Training Device

Described herein are embodiments of a self-supporting wearable device composed of an internal portion having one or more formed layers, wherein each of the one or more formed layers comprises a material independently selected from the group consisting of: a plastic, a resin, a silicone rubber, or a composite material, wherein the one or more formed layers are formed in the shape of a ventral portion of a human torso, wherein the internal portion is configured to contact a torso or a person or a manikin when optionally worn by the person or the manikin, a middle portion having one or more formed layers, wherein each of the one or more formed layers comprises a material independently selected from the group of a plastic, a resin, a silicone rubber, a polyurethane foam, or a composite material, wherein the one or more formed layers are formed in the shape of a ventral portion of a human torso; one or more simulated anatomical parts of a human torso coupled to one of the one or more formed layers of the middle portion; and an outer simulated skin, wherein the outer simulated skin is stretched over the middle portion such that the outer simulated skin assumes the shape formed from the middle portion; wherein the middle portion is sandwiched between and coupled to the outer simulated skin and the internal portion and wherein the internal portion is configured to support the middle portion and the external portion such that the wearable device is self-supporting when not optionally worn by the person or the manikin.

In some exemplary embodiments of a self-supporting and optionally wearable device including an external portion (e.g. an outer simulated skin), an internal portion, and a middle portion sandwiched between the external portion (e.g. outer simulated skin) and internal portion, wherein the external portion (e.g. outer simulated skin) is composed of a plurality of layers that include an outer simulated skin layer, wherein the simulated skin layer is composed of a silicone rubber embedded fabric; and one or more additional layers, wherein each layer is composed of one or more material selected from the group consisting of: a polyurethane foam, silicone rubber, and combinations thereof, wherein the internal portion is configured to contact the torso of a person or manikin when optionally worn by the person or manikin and is further configured to support the internal portion, the external portion, and a middle portion during use, particularly when the device is not worn by a subject and wherein the internal portion is composed of one or more formed layers, wherein each of the one or more formed layers is composed of a material independently selected from the group of: a plastic, a resin, a silicone rubber, or a composite material, and wherein the one or more formed layers are formed in the shape of a ventral portion of a human torso; and wherein collectively the one or more layers can provide sufficient strength and rigidity to support the middle portion and the external portion during use; wherein the middle portion, includes: one or more formed layers, wherein each of the one or more formed layers is composed of a material independently selected from the group of: a plastic, a resin, a silicone rubber, polyurethane foam, a composite material, or a combination thereof, and wherein the one or more formed layers are formed in the shape of a ventral portion of a human torso; and one or more non-organ simulated anatomical parts coupled to the middle portion and optionally the external portion and/or the internal portion; wherein the middle portion is sandwiched between and coupled to the external portion and the internal portion; wherein the external portion is stretched over the middle portion such that the external portion essentially assumes the shape of middle portion; and optionally, one or more fastening members coupled to the external portion, middle portion, internal portion, or a combination thereof, wherein the one or more fastening members are configured to secure the device to the torso of a subject when optionally worn during use.

Suitable plastics for use in the device as described herein, can include but are not limited to, polyester plastics and high density polyethylene plastics.

Suitable resins for use in the device as described herein, can include but are not limited to, high density polyethylene resins and polyester resins.

Suitable composite materials for use in the device as described herein, can include but are not limited to polyethylene and polyester plastics that can be encapsulated in polyurethane foam and silicone rubber. As used herein a "composite material" refers to materials are a combination of two or more materials with different physical and/or chemical properties such that the composite material does not have the exact same characteristics (physical, chemical, optical, and/or electrical, etc.) as any of the individual materials forming the composite material.

The external portion can have 1-10 additional layers. In some embodiments, each of the one or more additional layers of the external portion are different materials. In some embodiments, at least two of the one or more additional layers, when present, are different materials. In some embodiments, at least two of the one or more additional layers, when present, are the same material.

In some embodiments, the thickness of the external portion can range from about 5 mm to 10 cm or more. In some embodiments, the thickness of the external portion can range from about 5 mm, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, to 100 mm or more. In some embodiments, the thickness of the external portion can be about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mm or more. In some embodiments, the thickness of the skin simulating layer can range from about 5 mm to 6, 7, 8, 9, 10, 11, 12, 13, 14, 15, 16, 17, 18, 19, or 20 mm or more. In some embodiments, the thickness of the skin simulating layer can be about 5, 6, 7, 8, 9, 10, 11, 12, 13, 14, 15, 16, 17, 18, 19, or 20 mm or more. In some embodiments, the thickness of each additional layer can independently range from about 1 to 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mm or more. In some embodiments, the thickness of each additional layer can independently be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mm or more. In some embodiments, each of the one or more additional layers are different thicknesses. In some embodiments, at least two of the one or more additional layers, when present, are different thicknesses. In some embodiments, at least two of the one or more additional layers, when present, are the same material.

In some embodiments, the external portion is stretchable, pliable, cuttable, repairable, capable of accepting multiple forms of moulage makeup in order to simulate anatomic variation, capable of accepting different blunt and penetrating injuries, and combinations thereof.

In some embodiments, the skin simulating layer and the one or more additional layers of the of the external portion simulate human epidermal, dermal, subcutaneous, muscle layers, or combinations thereof.

In some embodiments, the one or more organ or non-organ simulated anatomical parts can be selected from a larynx, one or more humeri, one or more clavicles, sternum, one or more ribs, connective tissue, and combinations thereof.

In some embodiments, the device is configured to cover a neck, one or more shoulders, a chest, an abdomen region, or a combination thereof of an optional wearer.

In some embodiments, the device can weigh less than about 12, 13, 14, 16, 17, or 15 lbs. In some embodiments, the device weighs less than about 10 lbs.

In some embodiments, the device can include one or more radio-frequency identification tags or labels which can be placed on or embedded in the various layers of the device.

In some embodiments, the device is Bluetooth protocol compatible and can contain a Bluetooth protocol and/or wireless capable speakers capable of reproducing and projecting various bodily noises, such as a heartbeat, lung and breath sounds, and/or other patient sounds.

In some embodiments, the device can contain a radio frequency remote-controlled wireless switch connected to a battery powered pump capable of pumping colored water from a non-collapsible reservoir located on the inner surface of the middle layer through surgical tubing.

The device and portions thereof can be made using any suitable fabrication technique, including but not limited to hand or machine building and assembly, computer-aided design, computer numerical control and cutting, casting, injection molding, thermoforming, machine stamping, or additive manufacturing (also known as 3D-printing).

Figure 2:
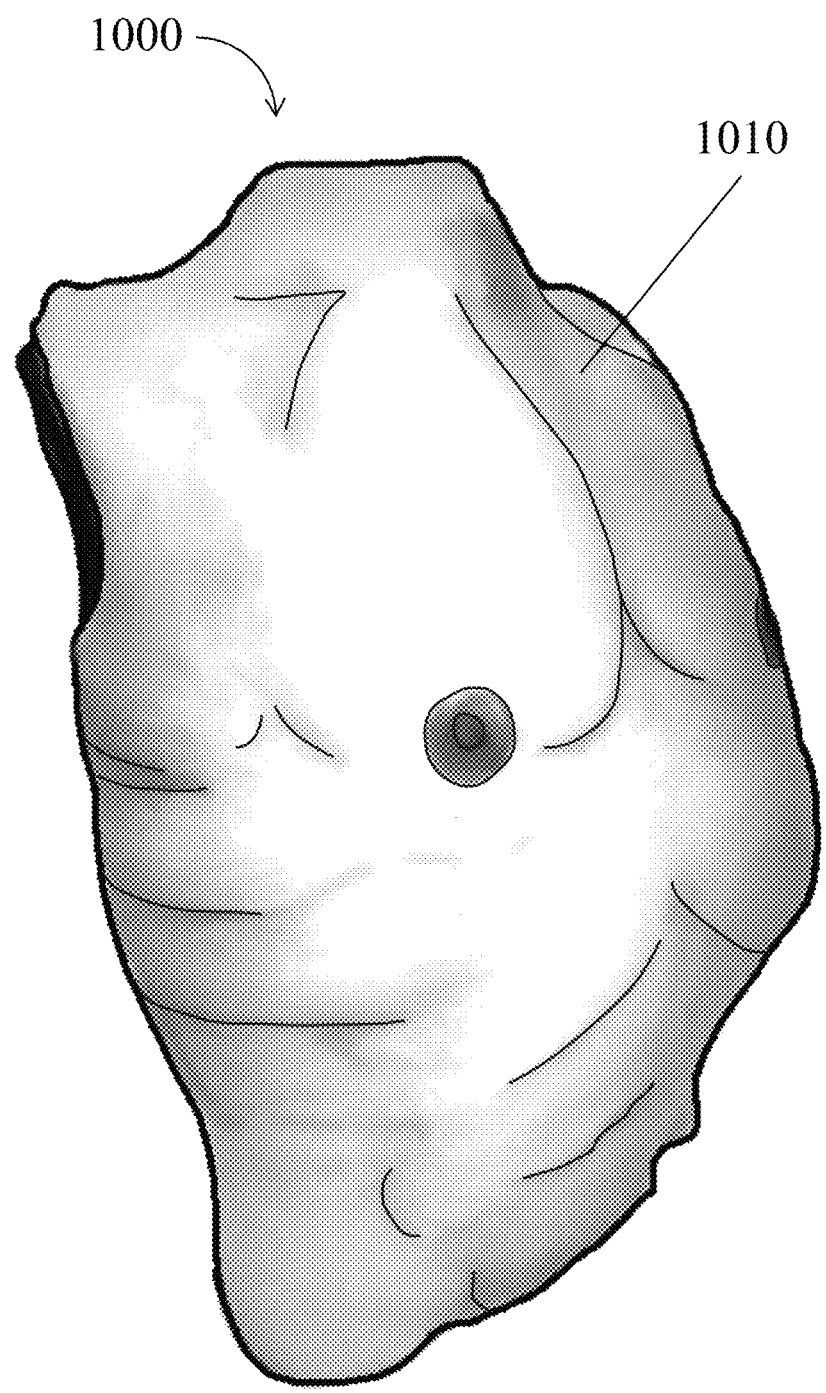
FIG. 2—A perspective view of an exemplary embodiment of a self-supporting wearable device specifically showing an external portion (i.e. an outer simulated skin) shown in FIG. 1.

Further details of the self-supporting wearable device are shown, for example, in FIGS. 1-34 herein. Attention is first directed to FIGS. 1-3, that show various views of exemplary embodiments of the self-supporting wearable device 1000. FIG. 1 shows a front view of an exemplary embodiment of the self-supporting wearable device 1000 specifically showing an external portion 1010 (i.e. an outer simulated skin), which can be configured to simulate aspects of a human torso. In some embodiments, the external portion 1010 is a simulated skin that covers the other portions (e.g. the middle and internal portions), of the device 1000. In some embodiments, the external portion 1010 simulates one or more features of a human (male or female) torso. In some embodiments, the external portion 1010 is multilayered and composed of an outermost (relative to the rest of the device and/or other layers in the external portion 1010) fabric layer and multiple layers coupled to the fabric layer, and when incorporated with a middle layer, are between the outermost fabric layer and the middle portion. In some embodiments, each of the multiple layers can be composed of a material. In some embodiments, the material for each layer is selected from a silicone rubber and polyurethane foam, which can be any suitable color, density, and/or thickness. In some embodiments, the materials for each layer are selected to provide certain properties or characteristics to the external portion 1010. In some embodiments, the material (including type, color, density, etc.) of each layer is chosen such that the external portion 1010 simulates human epidermal, dermal, subcutaneous, muscle layers, other anatomical features of the human skin and outer layers, and combinations thereof. For example, the material of one of the layers can be chosen such that it simulates muscle and the material for a second layer of the external portion 1010 can be chosen such that it simulates the dermis. In some embodiments, all the materials are the same. In some embodiments each layer is a different material. In some embodiments, when there are 3 or more layers, two or more of the layers are the same material. In some embodiments, when there are 3 or more layers, two or more of the layers are different materials. In some embodiments, the simulated skin contains or is only composed of a silicone rubber embedded fabric. In some embodiments, an outer simulated skin is stretchable, pliable, cuttable, repairable, and/or capable of accepting multiple forms of moulage makeup and props in order to simulate anatomic variation and different blunt and penetrating injuries. FIG. 2 shows a perspective view of an exemplary embodiment of a self-supporting wearable device 1000 specifically showing an external portion 1010 (i.e. an outer simulated skin) shown in FIG. 1.

Figure 3:
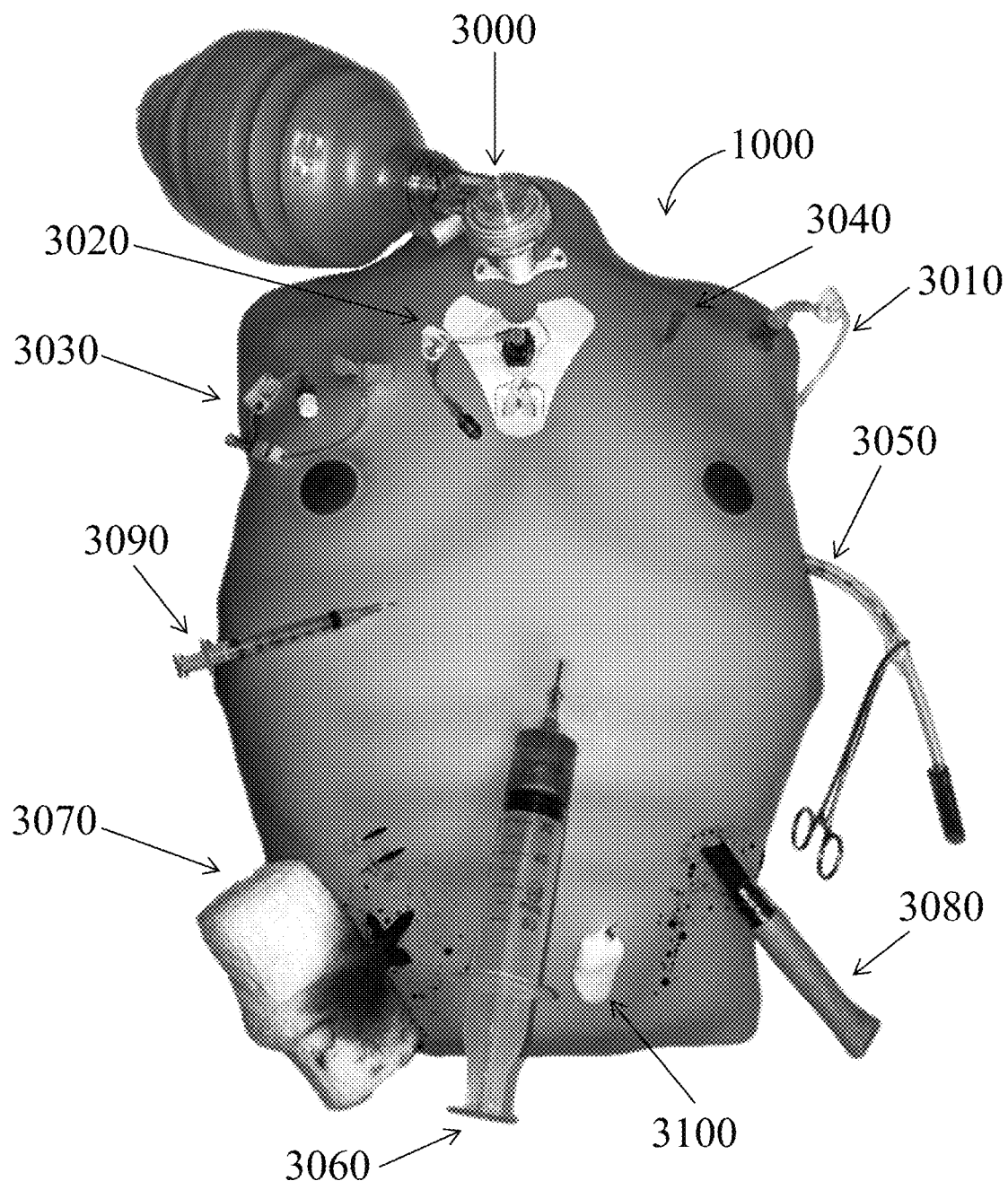
FIG. 3—A front view of an exemplary embodiment of the self-supporting wearable device described herein during use as a tabletop procedural medical training device.

FIG. 3 shows a front view of an exemplary embodiment of the self-supporting wearable device 1000 described herein during use as a tabletop procedural medical training device. FIG. 3 shows exemplary medical procedures that can be performed on the self-supporting wearable device 1000 either as a tabletop trainer or when worn by a user or manikin. FIG. 3 specifically shows the self-supporting wearable device 1000 being used as a self-supported table-top procedural skills training device. FIG. 3 shows several exemplary procedures that can be performed on the self-supporting wearable training device 1000. Others that can also be performed on the self-supporting wearable device 1000 will be appreciated in view of the description herein and are within the spirit and scope of this disclosure. FIG. 3 demonstrates a cricothyrotomy 3000, an intraosseous cannulation of bilateral humeral heads 3010, intraosseous cannulation of the sternum 3020, chest port access and/or care 3030, chest needle decompression at multiple bilateral rib spaces 3040, chest tube thoracostomy at multiple bilateral rib interspaces 3050, pericardiocentesis 3060, laceration repair, hematoma evacuation, wound packing, and/or puncture/abrasions/avulsion wound care 3070, foreign body and impalement stabilization and removal 3080, intramuscular/subcutaneous injections 3090, abscess incision and drainage 3100 and combinations thereof. Other exemplary procedures include, paracentesis, escharotomy, and others. Embodiments of the self-supporting wearable device 1000 are configured such that any of the procedures can be performed when the device 1000 is worn by a person or manikin or used as a stand-alone table-top device.

Figure 4A:
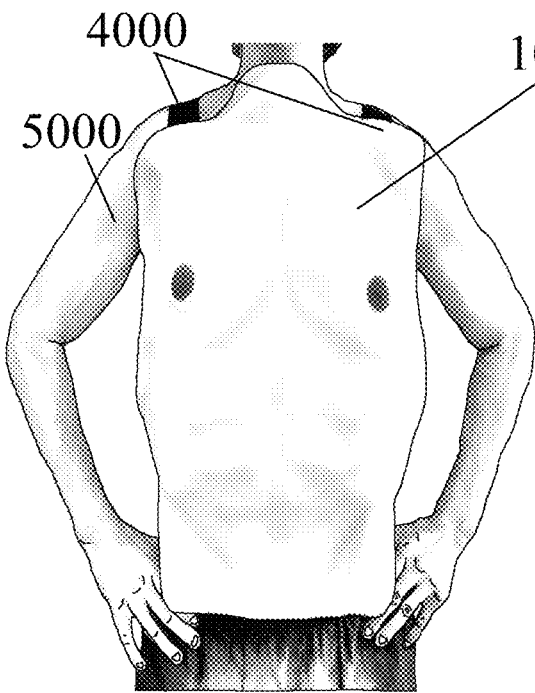
FIGS. 4A-4C—A front view (FIG. 4A), back view (FIG. 4B), and perspective view (FIG. 4C) of an exemplary embodiment of the self-supporting wearable device described herein being optionally worn by a user and secured to the user by exemplary fastening members (e.g. straps) attached to one or more portions of the self-supporting wearable device.
Figure 4B:
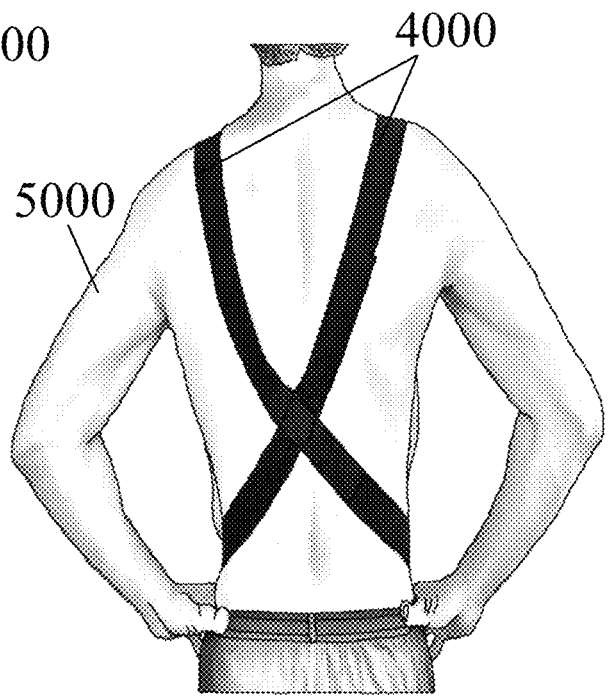
Figure 4C:
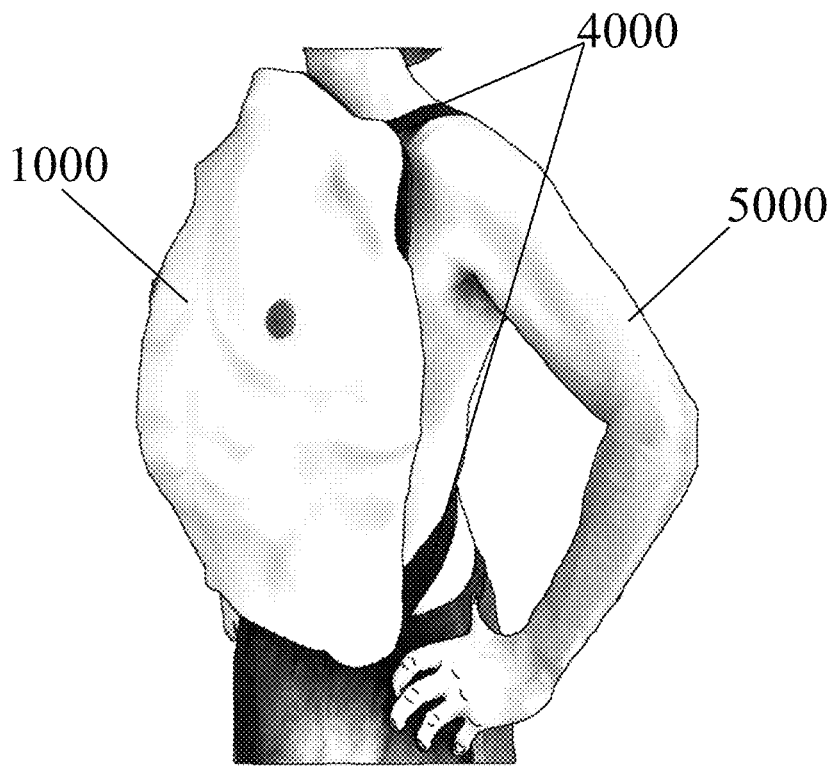
Figure 6A:
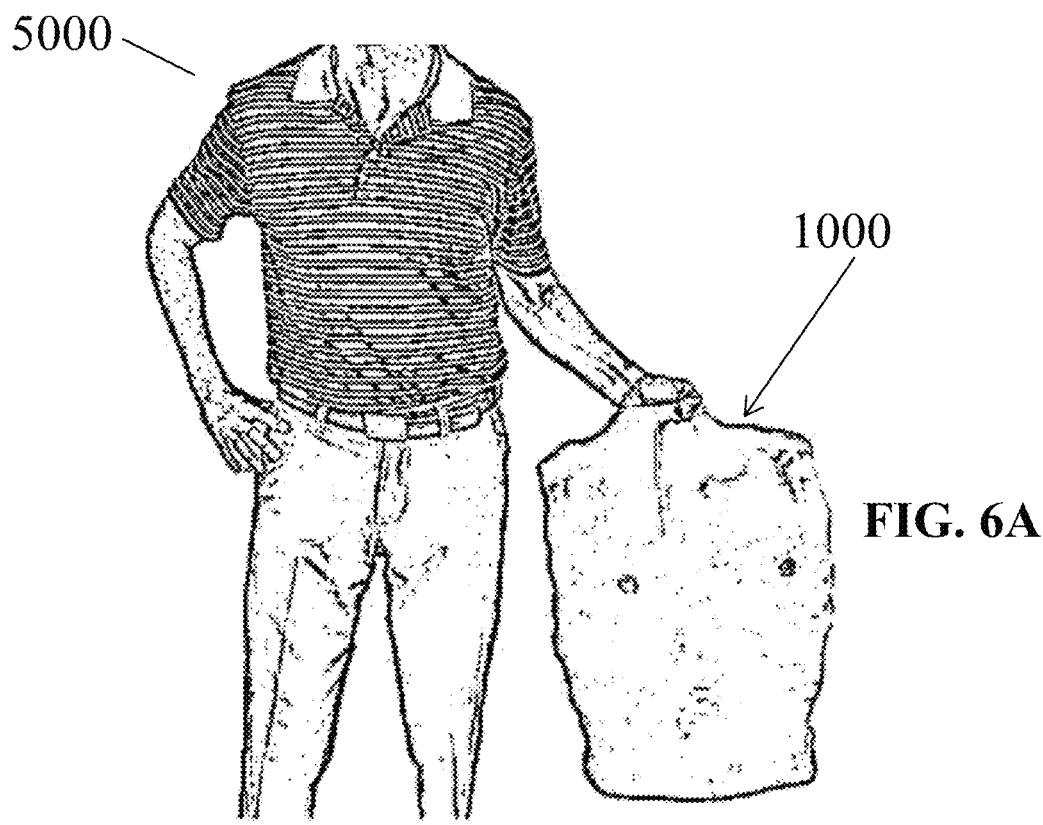
FIGS. 6A-6B—An exemplary embodiment of the self-supporting wearable device being held without the aid (FIG. 6A) of a fastening member or with the aid of a fastening member (FIG. 6B).
Figure 6B:
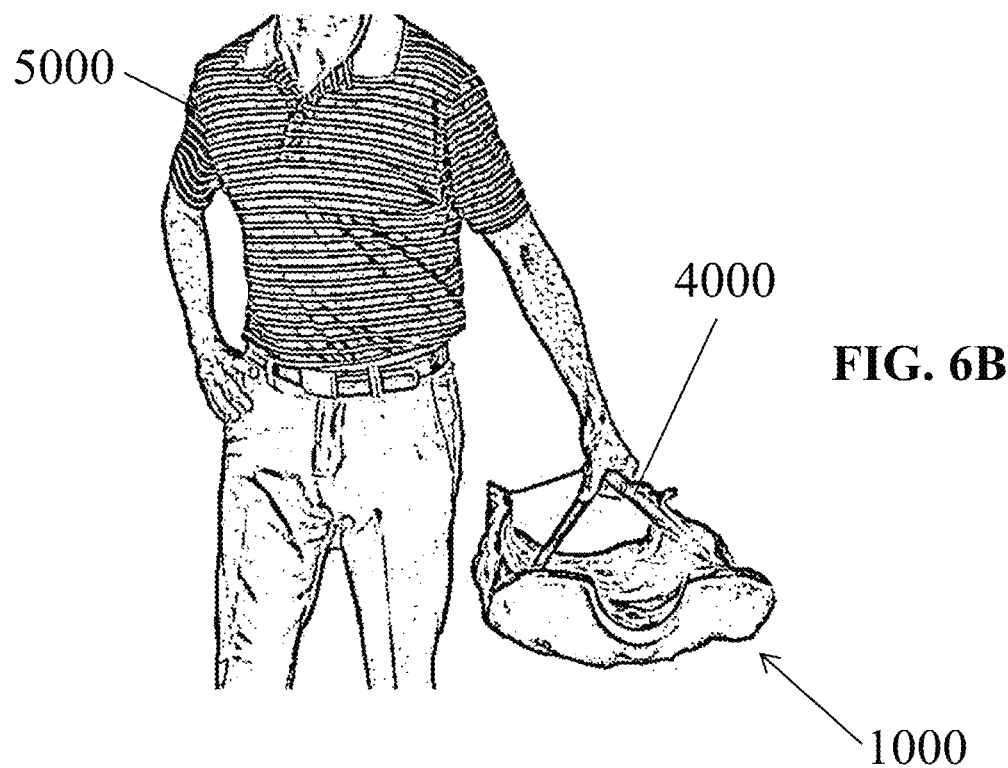

In some embodiments, the device can include one or more fastening members. In some embodiments, the one or more fastening members can be straps or be configured as a one or more portions of a shirt, back, or vest. With this in mind, attention is now directed to FIGS. 4A-6B, which generally show embodiments of the self-supported wearable device 1000 that include one or more fastening members 4000. FIGS. 4A-4C show a front view (FIG. 4A), back view (FIG. 4B), and perspective view (FIG. 4C) of an exemplary embodiment of the self-supporting wearable device 1000 described herein being optionally worn by a user 5000 and secured to the user 5000 by one or more exemplary fastening members (e.g. one or more straps) 4000 attached to one or more portions of the self-supporting wearable device. FIGS. 5A-5C show a front view (FIG. 5A), back view (FIG. 5B), and perspective view (FIG. 5C) of an exemplary embodiment of the self-supporting wearable device 1000 described herein being optionally worn by a user 5000 and secured to the user 5000 by an exemplary fastening member (e.g. a shirt or vest) attached to one or more portions of the self-supporting wearable device 1000. The self-supporting wearable device 1000 can be worn comfortably by a person 5000 to significantly increase the fidelity and realism of the intended medical simulations and training. All features of the device are fully functional in this state (when worn by a person or manikin). In some embodiments, the self-supporting wearable device 1000 is designed to cover and protect the neck, shoulders, chest, and/or abdomen of the wearer 5000. As shown in FIGS. 6A-6B, in some embodiments, the self-supporting wearable device 1000 can be easily carried by the one or more fastening members 4000. The one or more fastening members 4000 can be, without limitations, any suitable materials or configurations that can secure the device to a wearer 5000 or manikin. Suitable materials include, without limitation, multiple fabric, synthetic, or hook-and-loop straps or fasteners.

As previously discussed, the self-supporting wearable device 1000 contains a middle portion. With this in mind, attention is directed to FIGS. 7-17, which generally show various embodiments and features of the middle portion 7000 of the self-supporting wearable device 1000.

Figure 7:
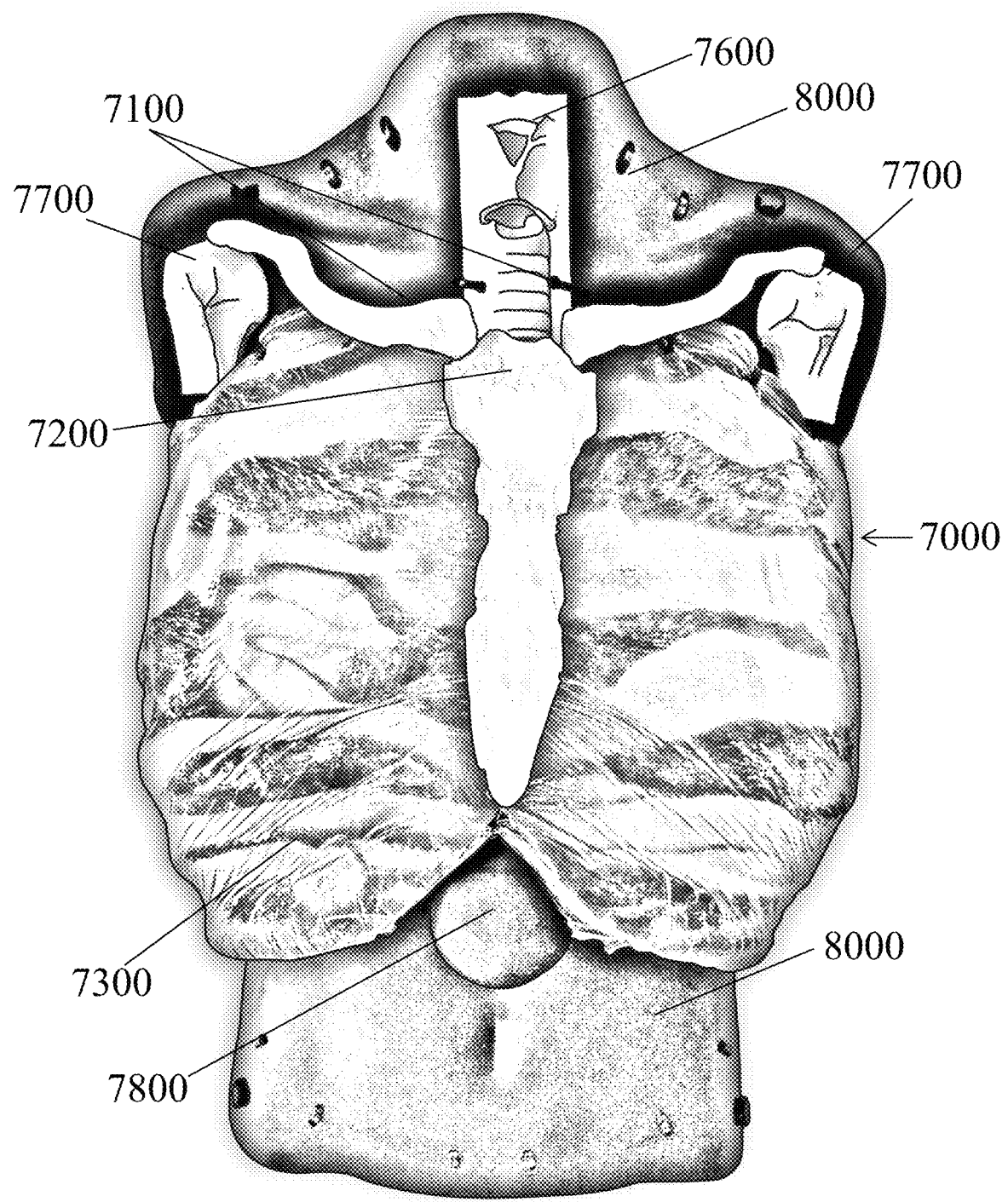
FIG. 7—A front view of an exemplary embodiment of the self-supporting wearable device described herein showing an embodiment of a middle portion of the device with exemplary simulated anatomical parts of a human torso, such as bone and/or cartilage structures (e.g. larynx, humeri, clavicles, sternum, and ribs), as well as related soft tissue structures (e.g. connective tissues, muscle, and/or adipose tissue).

FIG. 7 shows a front view of an exemplary embodiment of the self-supporting wearable device 1000 showing an embodiment of a middle portion 7000 of the wearable device 1000 with exemplary simulated anatomical parts of a human torso, such as bone and/or cartilage structures (e.g. larynx 7600, humeri 7700, clavicles 7100, sternum 7200, and ribs), as well as related soft tissue structures 7300 (e.g. connective tissues, muscle, and/or adipose tissue), which in some embodiments can encapsulate the bone and/or cartilage structures. FIG. 7 does not show the outer simulated skin that can be stretched over the middle portion. In some embodiments, a simulated pericardial connective tissue layer 7800 is coupled to the middle portion of the wearable device, which can be composed of self-sealing layers of plastic film, silicone rubbers, polyurethane foam or composite materials. In some embodiments, the middle portion, layers thereof, and/or components thereof and/or coupled thereto are composed of firm molded plastics, resins, silicone rubbers, polyurethane foam or composite materials formed in the shape of a human male or female anterior torso 8000.

Figure 8:
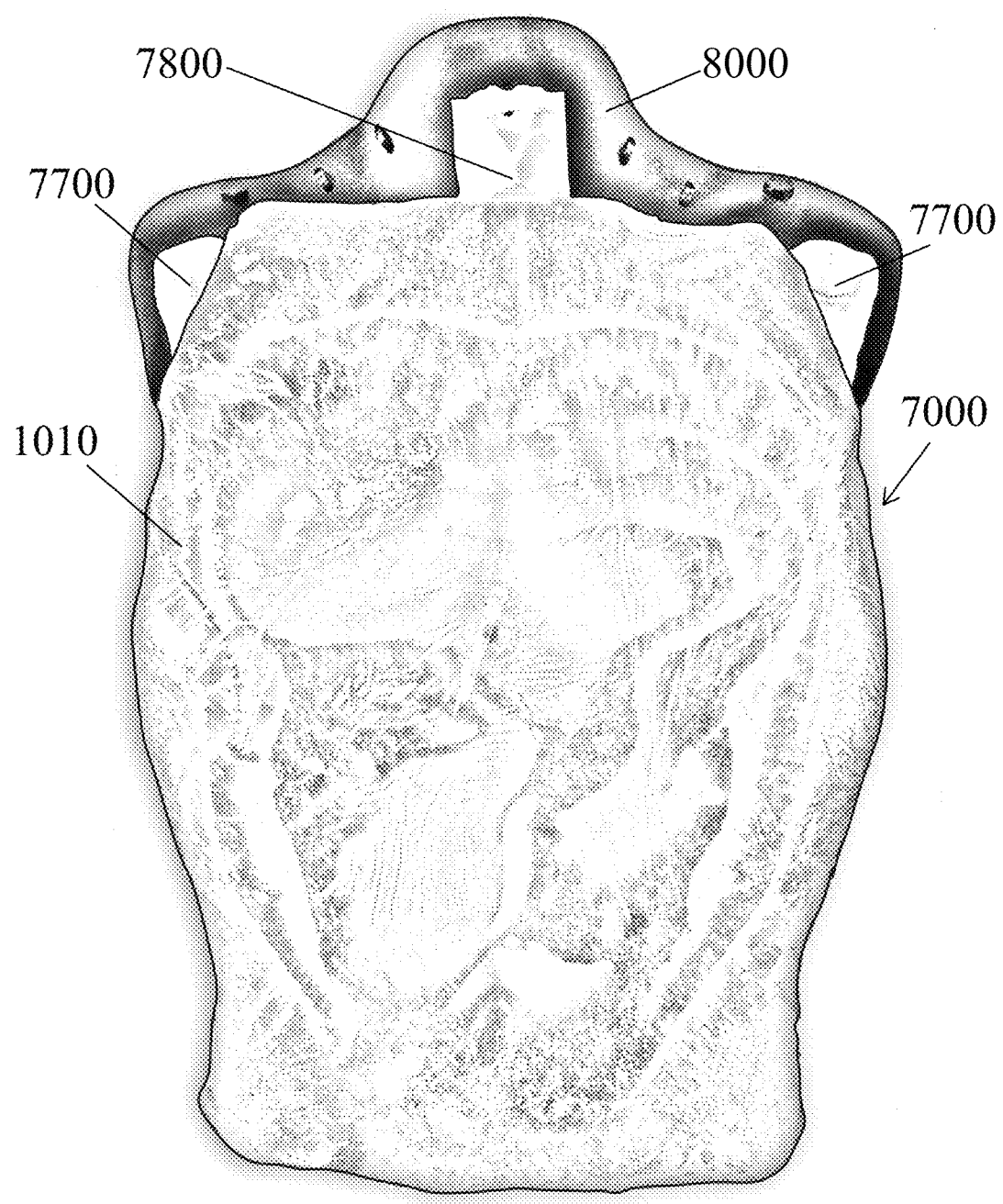
FIG. 8—A front view of an exemplary embodiment the self-supporting wearable device described herein showing an exemplary embodiment of the middle portion having a formed layer with exemplary simulated anatomical parts of a human torso, such as soft tissue structures (e.g. adipose, muscle, connective tissue, and/or organs), covered with the external portion and coupled to the middle portion of the self-supporting wearable device. In some embodiments, the simulated soft tissue structures can be coupled to simulated bone structures (e.g. such as those shown in FIG. 7) or other parts of the middle portion.

FIG. 8 shows a front view of an exemplary embodiment the self-supporting wearable device 1000 described herein showing an exemplary embodiment of the middle portion 7000 having a formed layer 8000 that can be formed so as to have exemplary simulated anatomical parts of a human torso. Soft tissue structures (e.g. adipose, muscle, connective tissue, and/or organs) 7300 can be coupled to the formed layer 8000 and be covered with the external portion 1010 and coupled to the middle portion 7000 of the self-supporting wearable device 1000. In some embodiments, the simulated soft tissue structures 7300 can be coupled to e.g. simulated bone structures (e.g. such as those shown in FIG. 7) or other parts of the middle portion 7000.

Figure 9A:
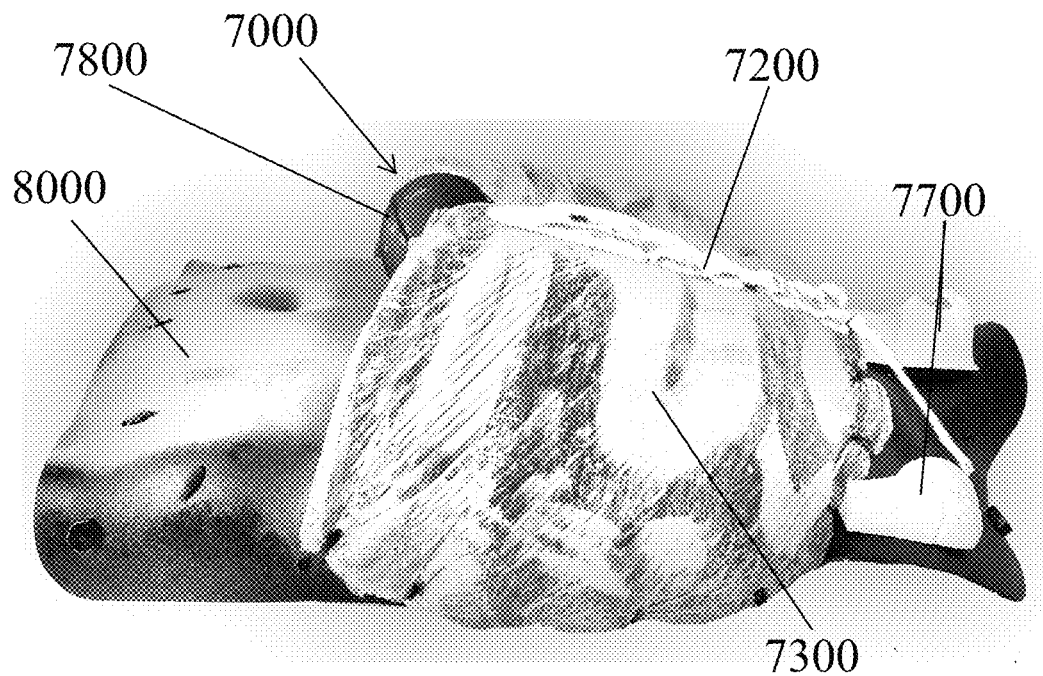
FIGS. 9A-9B—Side views of an exemplary embodiment of the self-supporting wearable device described herein showing a formed layer of the middle portion in the shape of a human male or female anterior torso with simulated soft tissue structures, which can be coupled to e.g. simulated bone structures (e.g. such as those shown in FIG. 7) or other parts of the middle portion 7000.
Figure 9B:
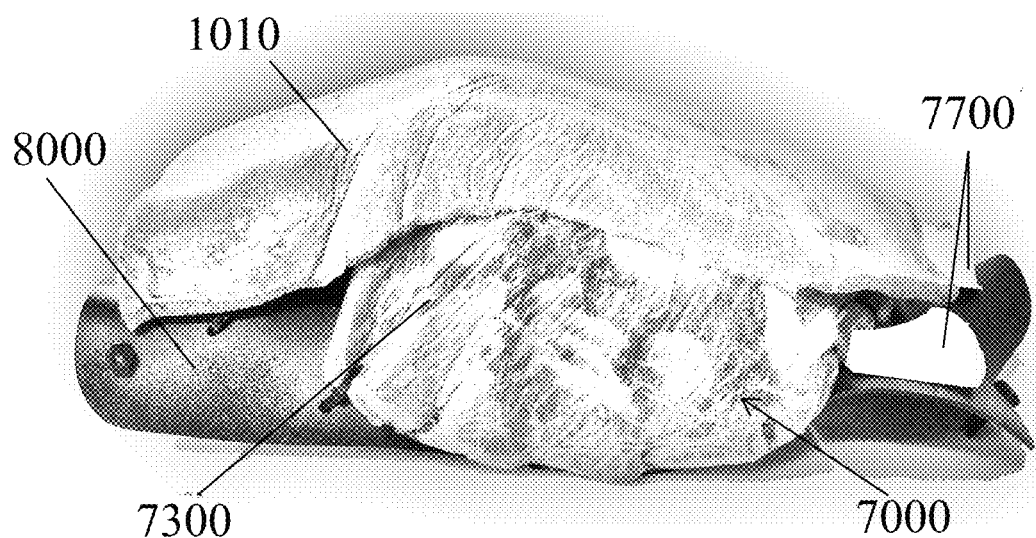

FIGS. 9A-9B shows side views of an exemplary embodiment of the self-supporting wearable device 1000 described herein showing a formed layer 8000 of the middle portion 7000 in the shape of a human male or female anterior torso with simulated soft tissue structures 7300, which can be coupled to e.g. simulated bone structures (e.g. such as those shown in FIG. 7) or other parts (such as the formed layer 8000) of the middle portion 7000. FIG. 9A shows the wearable device 1000 without the external portion and FIG. 9B shows the device with the external portion 1010. The middle portion and/or external portion can be coupled to an internal portion 9000.

Figure 10:
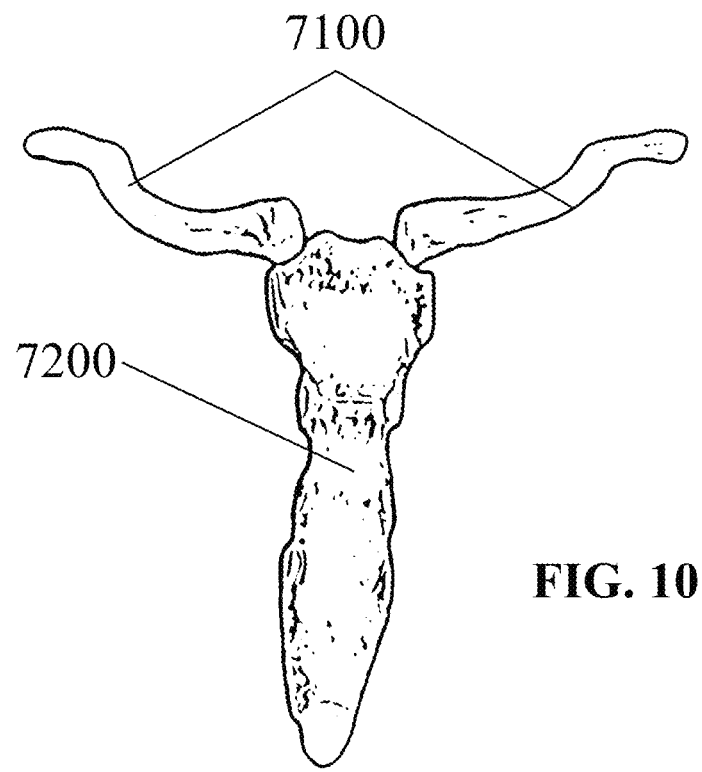
FIG. 10—An exemplary embodiment of a simulated sternum and clavicles that can be coupled to the middle portion.

FIG. 10 shows an exemplary embodiment of a simulated sternum 7200 and clavicles 7100 that can be coupled to the middle portion 7000.

Figure 11:
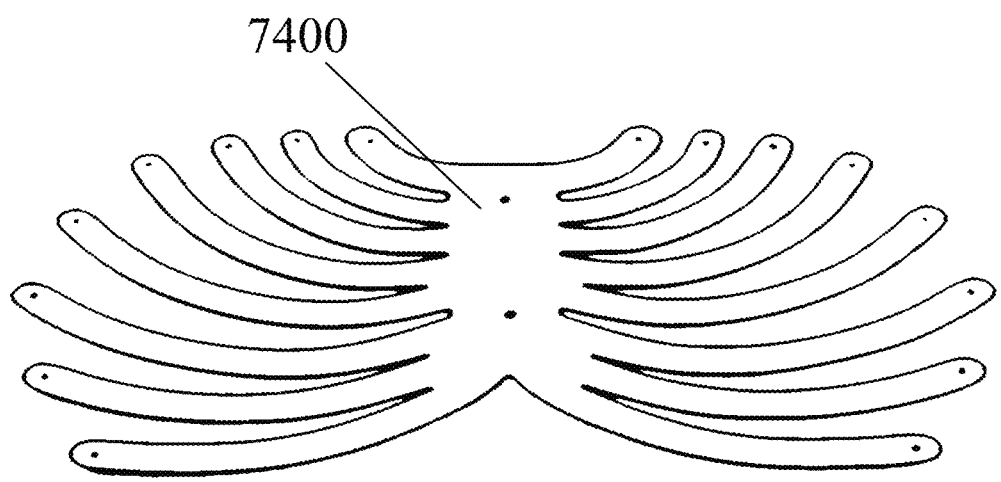
FIG. 11—An exemplary embodiment of a simulated rib cage that can be coupled to a simulated sternum, such as that shown in FIG. 10, and/or middle portion.

FIG. 11 shows an exemplary embodiment of a simulated rib cage 7400 that can be coupled to a simulated sternum 7200, such as that shown in FIG. 10, and/or middle portion 7000.

Figure 12:
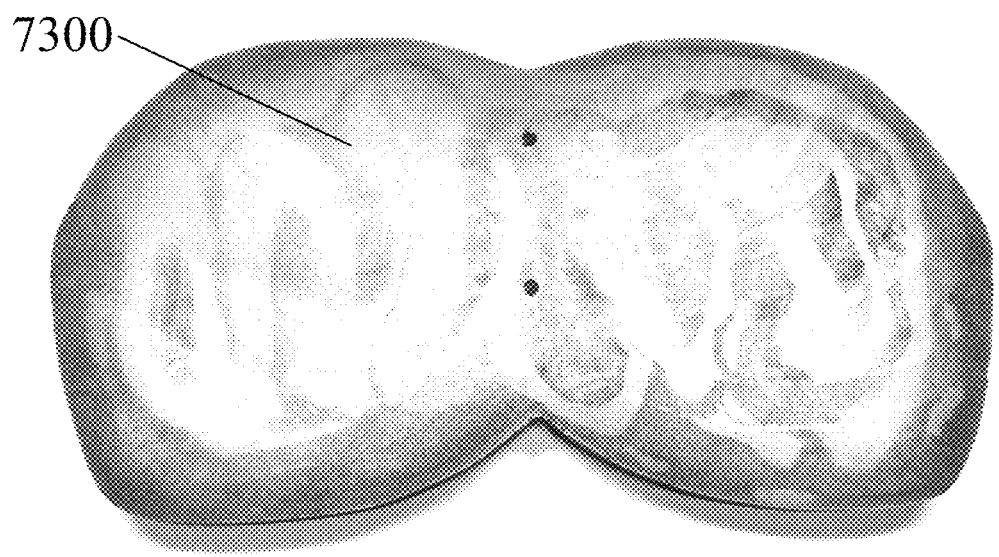
FIG. 12—An exemplary embodiment of simulated soft tissues (e.g. connective tissue, muscle, and/or adipose tissue) that can encapsulate and/or be coupled to a simulated rib cage (such as that shown in FIG. 11) and be coupled to the middle portion.

FIG. 12 shows an exemplary embodiment of simulated soft tissues (e.g. connective tissue, muscle, and/or adipose tissue) 7300 that can encapsulate and/or be coupled to a simulated rib cage 7400 (such as that shown in FIG. 11) and be coupled to the middle portion 7000.

Figure 13:
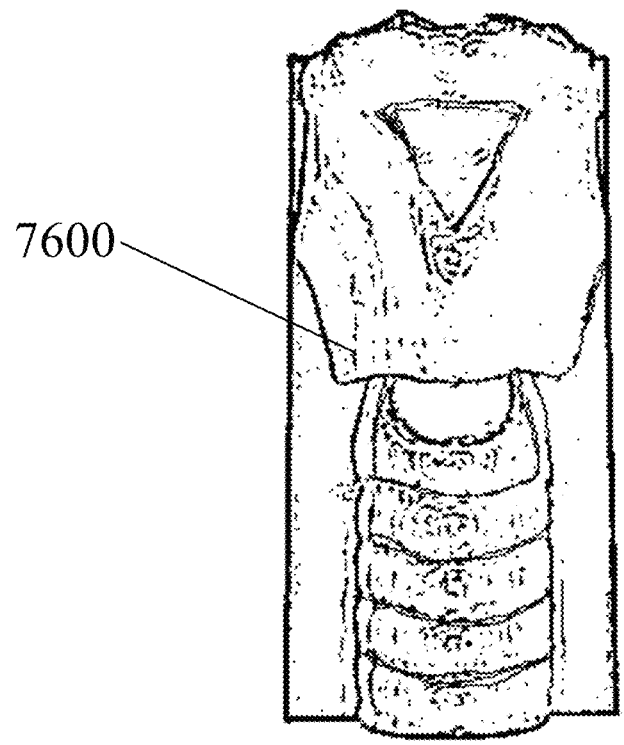
FIG. 13—An exemplary embodiment of a simulated larynx that can be coupled to a middle portion.

FIG. 13 shows an exemplary embodiment of a simulated larynx 7600 that can be coupled to a middle portion 7000.

Figure 14:
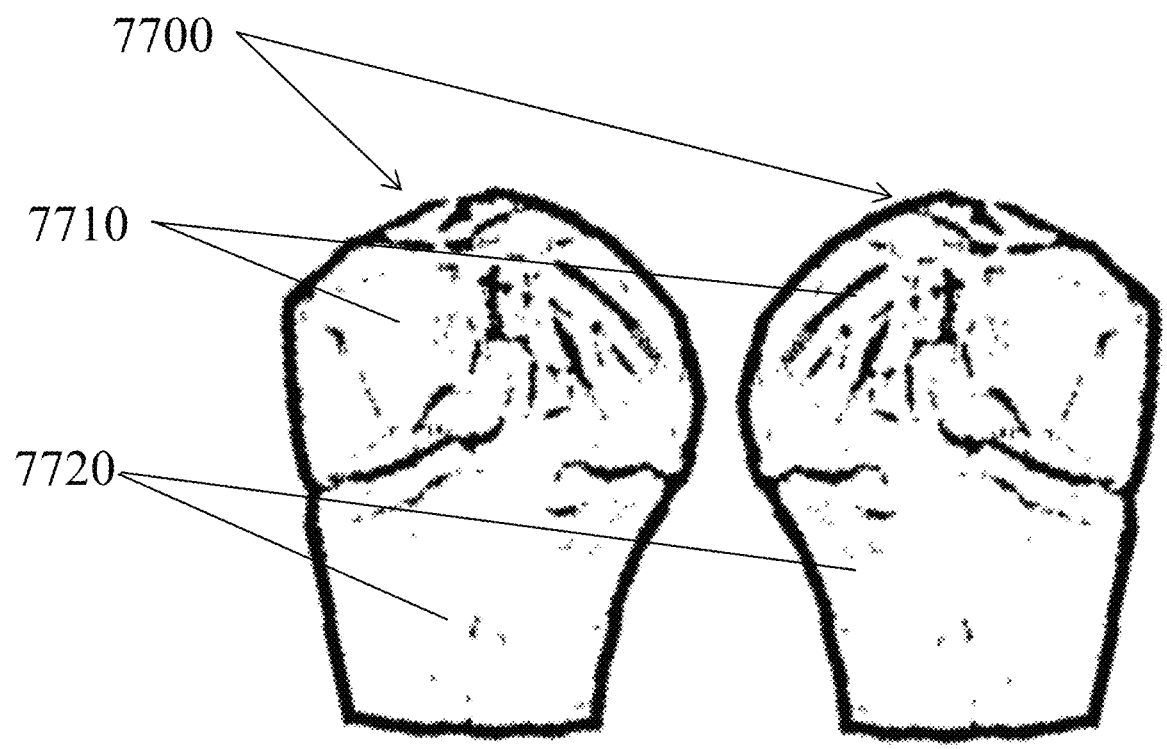
FIG. 14—An exemplary embodiment of simulated head and neck portions of a left and right human humeri that can be coupled to the middle portion and/or one or more other simulated anatomical parts that can be included in the self-supporting wearable device described herein.

FIG. 14 shows an exemplary embodiment of simulated humeri 7700 showing head 7710 and neck 7720 portions of a left and right human humeri 7700 that can be coupled to the middle portion 7000 and/or one or more other simulated anatomical parts that can be included in the self-supporting wearable device 1000 described herein.

Figure 15:
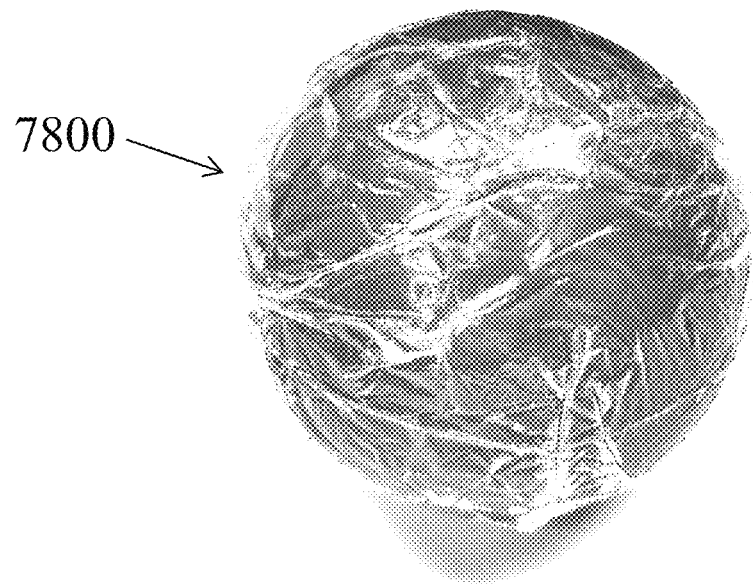
FIG. 15—An exemplary embodiment of a simulated pericardium that can be configured to simulate medical conditions to provide a realistic response during performance of a medical procedure on the self-supporting wearable device described herein.

FIG. 15 shows an exemplary embodiment of a simulated pericardium 7800 that can be configured to simulate medical conditions to provide a realistic response during performance of a medical procedure on the self-supporting wearable device 1000 described herein. In some embodiments, the simulated pericardium can be composed of a hollow ball covered in a thin layer of self-sealing silicone rubber material that is capable of being punctured or otherwise breached. In some embodiments, the simulated pericardium contains a fluid within the hollow inside of the ball. In some embodiments, the fluid simulates blood or other bodily fluid. In some embodiments, the ball is a multi-purpose inflatable rubber ball. In some embodiments, the material around the ball is plastic heat-sensitive shrink wrap and/or film.

FIGS. 16A-16C show a front view (FIG. 16A), side view (FIG. 16B), and back view (FIG. 16C) of an exemplary embodiment of a self-supporting wearable device 1000 described herein that showing a formed layer 8000 of the middle portion 7000 of the device 1000 that can be coupled to the external portion 1010 and optional simulated anatomical parts. Exemplary points of and/or means for attachment 8500 for, e.g., one or more simulated anatomical parts and/or outer simulated skin 1010 on the formed layer 8000 of the middle portion 7000 are shown. FIGS. 16A-16C show cutouts that can function as compression fittings can be used to secure one or more other portions (e.g. an external 1010 and or middle portion 7000 or component thereof to the internal portion 9000.

Figure 17:
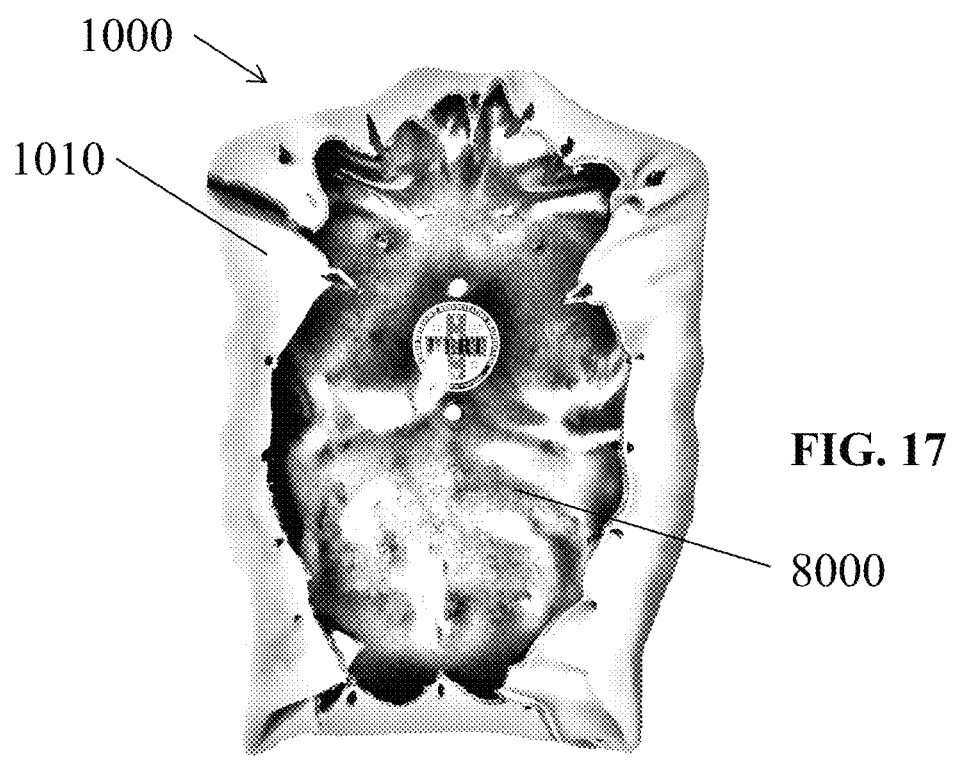
FIG. 17—A back view of an exemplary embodiment of the self-supporting wearable device described herein that shows a formed layer of the middle portion of the self-supporting wearable device with an external portion (e.g. outer simulated skin) stretched over and coupled to the formed layer of the middle portion such that the external portion assumes the shape of the middle and/or internal portions.

FIG. 17 shows a back view of an exemplary embodiment of the self-supporting wearable device 1000 described herein that shows the formed layer 8000 of the middle portion 7000 of the self-supporting wearable device 1000 with an external portion 1010 (e.g. outer simulated skin) stretched over and coupled to the formed layer 8000 of the middle portion 7000 such that the external portion assumes the shape of the middle and/or internal portions.

Figure 18:
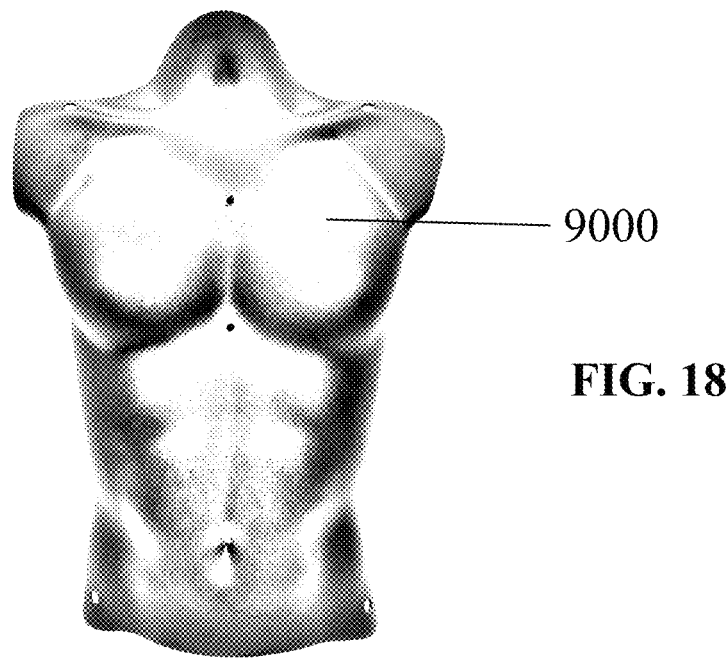
FIG. 18—A front view of an exemplary embodiment of internal portion of the self-supporting wearable device described herein.
Figures 19, 20:
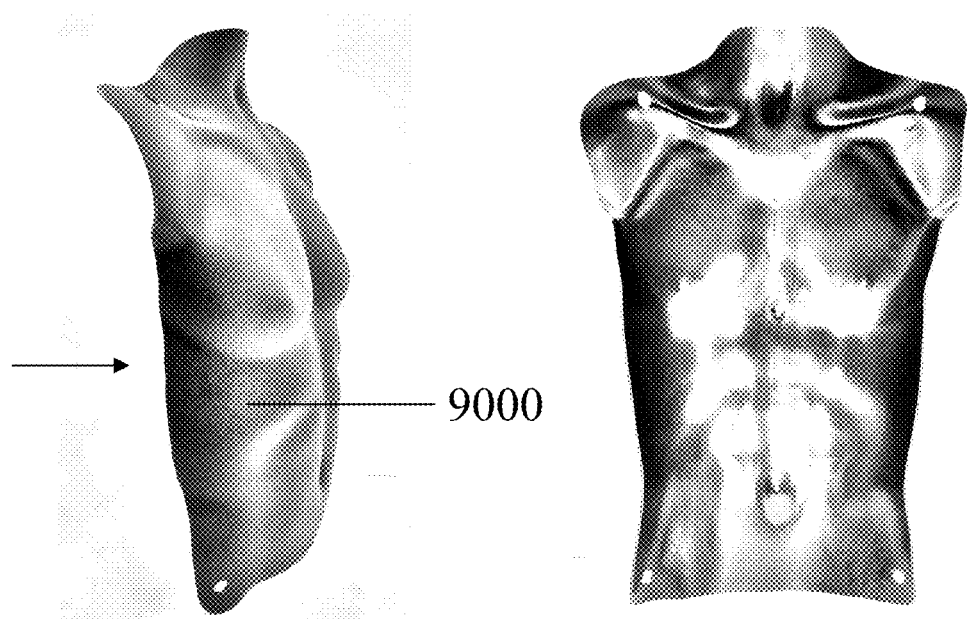
FIG. 19—A side view of an exemplary embodiment of internal portion of the self-supporting wearable device described herein.
FIG. 20—A back view of an exemplary embodiment of internal portion of the self-supporting wearable device described herein, which shows the side of the internal portion that would come in contact with the torso of a user when optionally worn by the user.

As previously discussed, the self-supporting wearable device 1000 can contain an internal portion. With this in mind attention is directed to FIGS. 18-21, which generally show embodiments of the internal portion 9000 and features thereof. FIG. 18 shows a front view of an exemplary embodiment of internal portion 9000 of the self-supporting wearable device 1000 described herein. In some embodiments, the internal portion 9000 can be composed of firm molded plastics, resins, silicone rubbers or composite materials formed in the shape of a human male or female anterior torso. In some embodiments, the internal portion 9000 is configured to fit snugly inside the middle portion 7000, such as the formed layer 8000 of the middle portion 7000, and can protect a person's neck, shoulders, chest, and abdomen if worn by a user, or can form a sturdy, self-supporting base for the device 1000 if used off the body as a tabletop procedural skills trainer. FIG. 19 shows a side view of an exemplary embodiment of internal portion 9000 of the self-supporting wearable device 1000 described herein. The arrow indicates the surface of the internal portion 9000 that would be closest to and optionally in contact with a person or manikin if worn.

Figure 21:
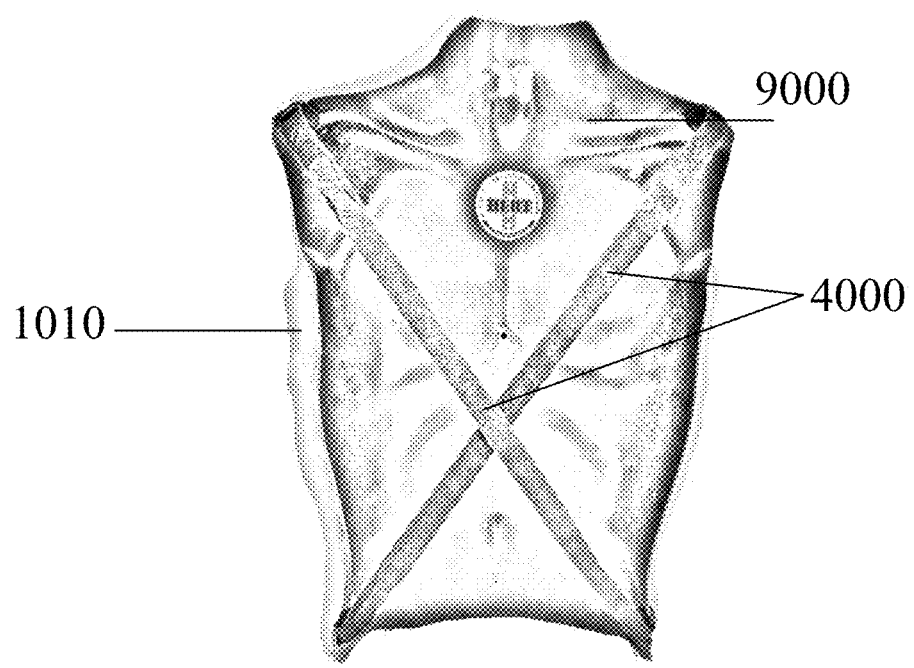
FIG. 21—A back view of an exemplary embodiment of the self-supporting wearable device described herein with an exemplary embodiment of fastening members coupled to the self-supporting wearable device and showing the side of the internal portion that would come in contact with the torso of a user when optionally worn by the user.

FIG. 20 shows a back view of an exemplary embodiment of internal portion 9000 of the self-supporting wearable device 1000 described herein, which shows the side of the internal portion 9000 that would come in contact with the torso of a user when optionally worn by the user (e.g. the surface indicated by the arrow in FIG. 19). FIG. 21 shows a back view of an exemplary embodiment of the self-supporting wearable device described herein with an exemplary embodiment of fastening members coupled to the self-supporting wearable device and showing the side of the internal portion that would come in contact with the torso of a user when optionally worn by the user. As previously discussed, the one or more fastening members 4000 can be any suitable securing device, to include but are not limited to, fabric, synthetic, or hook-and-loop straps or fasteners.

Methods of Using the Wearable Training Device

Also described herein are methods of using the wearable device described in greater detail herein. An advantage of the configuration of the device is that it is strong enough to be used as a stand-alone device when placed on a surface with the external portion facing out and away from the surface it is placed on but is also appropriately shaped and/or soft enough such that it is comfortable enough for a human to wear through a medical or other procedure being performed on the device. Additionally, described herein are embodiments of a method of using the wearable device described herein, the method comprising: optionally securing the device to a torso of a human or manikin, or positioning the device on a surface with the external portion in facing away from the surface; performing a simulated medical procedure on the device. In some embodiments, the procedure can be a cricothyrotomy, intraosseous cannulation of bilateral humeral heads, intraosseous cannulation of the sternum, intramuscular injections, subcutaneous injections, chest tube thoracostomy at multiple bilateral rib interspaces, laceration repair, abscess incision and drainage, hematoma evacuation, foreign body and impalement stabilization and removal, puncture/abrasions/avulsion wound care, chest needle decompression at multiple bilateral rib interspaces, pericardiocentesis, paracentesis, escharotomy, chest port access and care, or a combination thereof.

In some exemplary embodiments, a method of using the wearable self-supporting device described herein includes securing the device to a torso of a human or manikin or positioning the device on a surface with the outer simulated skin in facing away from the surface; and performing a simulated medical procedure on the device. In some embodiments, the medical procedure is a cricothyrotomy, intraosseous cannulation of one or both humeral heads, an intraosseous cannulation of the sternum, an intramuscular injection, a subcutaneous injection, a chest tube thoracostomy, optionally at multiple bilateral rib interspaces, a laceration repair, an abscess incision and drainage, a hematoma evacuation, a foreign body and impalement stabilization and removal, a puncture wound care, an abrasion care, suturing, an avulsion wound care, a chest needle decompression, optionally at multiple bilateral rib interspaces, a pericardiocentesis, a paracentesis, an escharotomy, a chest port access and care, or a combination thereof.

In some embodiments, the method includes making an incision in one or more regions of the device. In some embodiments, the method includes piercing, cutting, burning, wetting, applying an electric charge to one or more layers of the external portion and/or middle portion. In some embodiments, the method includes applying a pressure one or more times to one or more portions of the wearable device, such as simulating chest compressions.

Figure 22:
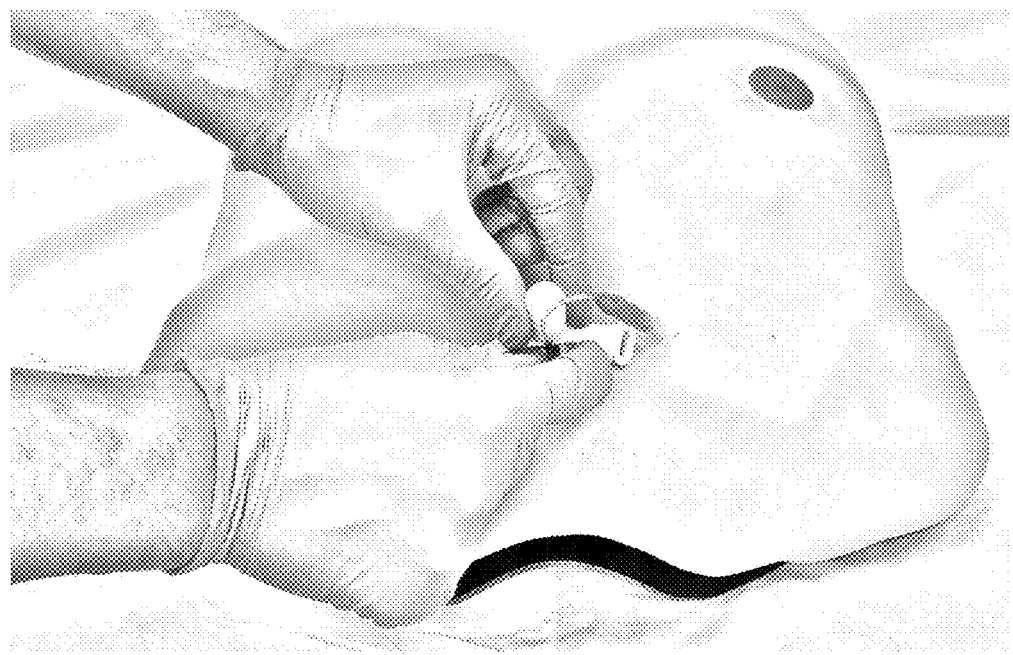
FIG. 22—An exemplary embodiment of a method of using the self-supporting wearable device during performance of a cricothyrotomy on the device, which can be performed when the device is worn by a user or manikin or placed on a surface.

FIGS. 22-34 show the self-supporting wearable device in various methods of exemplary use. FIG. 22 shows exemplary embodiment of a method of using the self-supporting wearable device 1000 during performance of a cricothyrotomy on the device, which can be performed when the device is worn by a user or manikin or placed on a surface.

Figure 23:
FIG. 23—An exemplary embodiment of a method of using the self-supporting wearable device during performance of an intraosseous cannulation of the right humerus on the device, which can be performed on either simulated humeral head when the device is worn by a user or manikin or placed on a surface.

FIG. 23 shows an exemplary embodiment of a method of using the self-supporting wearable device 1000 during performance of an intraosseous cannulation of the right humerus on the device, which can be performed on either simulated humeral head when the device is worn by a user or manikin or placed on a surface.

FIG. 24 shows an exemplary embodiment of a method of using the self-supporting wearable device 1000 during performance of an intraosseous cannulation of the simulated sternum on the device, which can be performed when the device is worn by a user or manikin or placed on a surface.

FIGS. 25A-25B show exemplary embodiment of a method of using the self-supporting wearable device 1000 during performance of needle decompression of the anterior right chest (FIG. 25A) and lateral right chest (FIG. 25B), which can be performed at one or more bilateral rib interspaces on the self-supporting wearable device 1000 when the device is worn by a user or manikin or placed on a surface.

Figure 26:
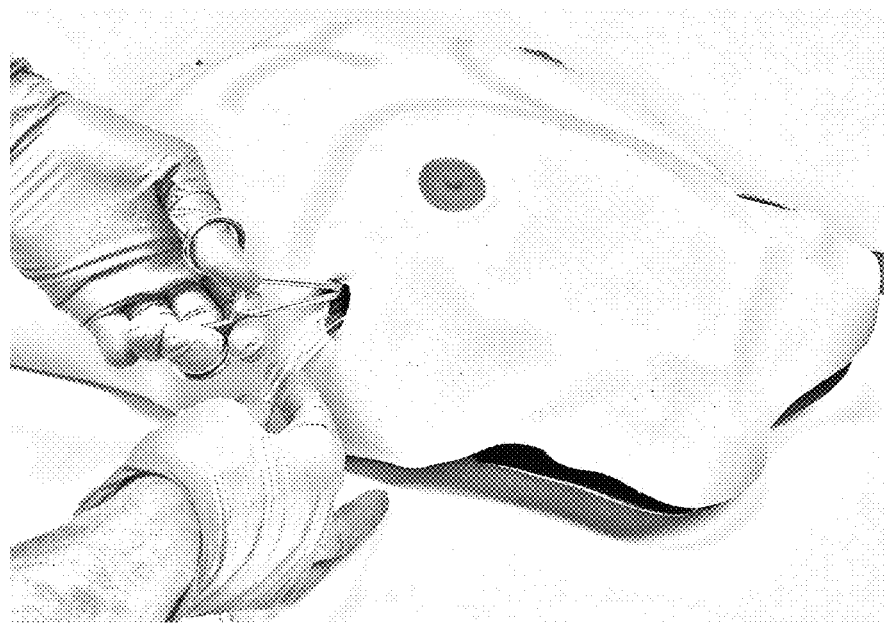
FIG. 26—An exemplary embodiment of a method of using the self-supporting wearable device during performance of a chest tube thoracostomy, which can be performed at one or more bilateral rib interspaces when the device is worn by a user or manikin or placed on a surface.

FIG. 26 shows an exemplary embodiment of a method of using the self-supporting wearable device 1000 during performance of a chest tube thoracostomy, which can be performed at one or more bilateral rib interspaces when the device is worn by a user or manikin or placed on a surface.

Figure 27:
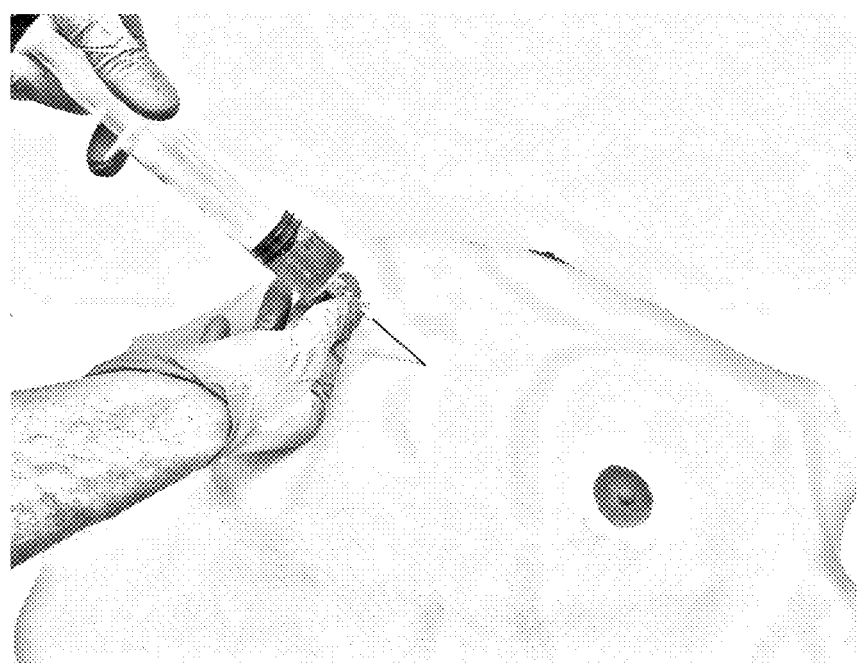
FIG. 27—An exemplary embodiment of a method of using the self-supporting wearable device during performance of a pericardiocentesis, which can be performed when the device is worn by a user or manikin or placed on a surface.

FIG. 27 shows an exemplary embodiment of a method of using the self-supporting wearable device 1000 during performance of a pericardiocentesis, which can be performed when the device is worn by a user or manikin or placed on a surface.

Figure 28A:
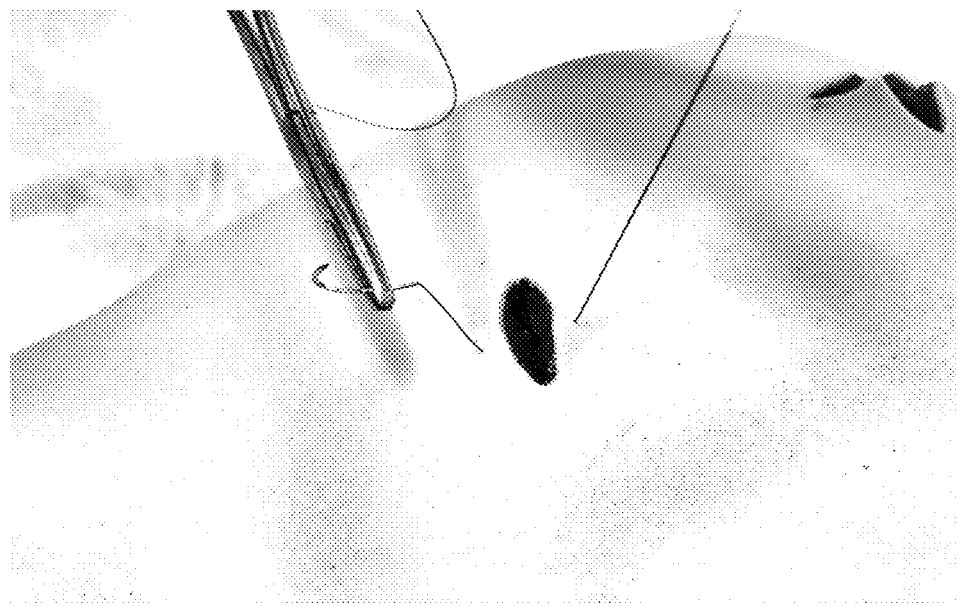
FIGS. 28A-28B—An exemplary embodiment of a method of using the self-supporting wearable device during performance of a wound closing procedure using sutures (FIG. 28A) and staples (FIG. 28B), which can be performed when the device is worn by a user or manikin or placed on a surface.
Figure 28B:
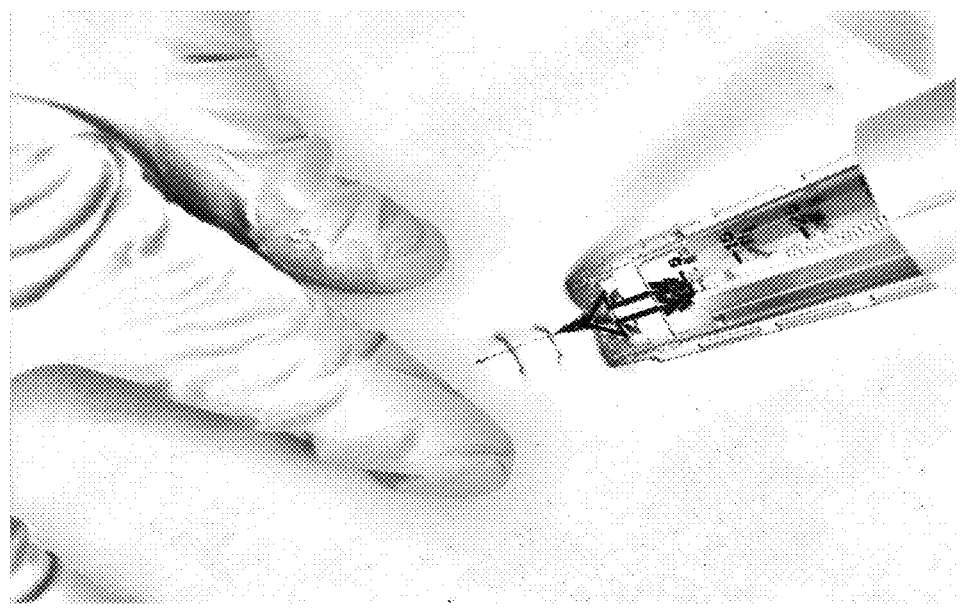

FIGS. 28A-28B show an exemplary embodiment of a method of using the self-supporting wearable device during performance of a wound closing procedure using sutures (FIG. 28A) and staples (FIG. 28B), which can be performed when the device is worn by a user or manikin or placed on a surface.

Figure 29:
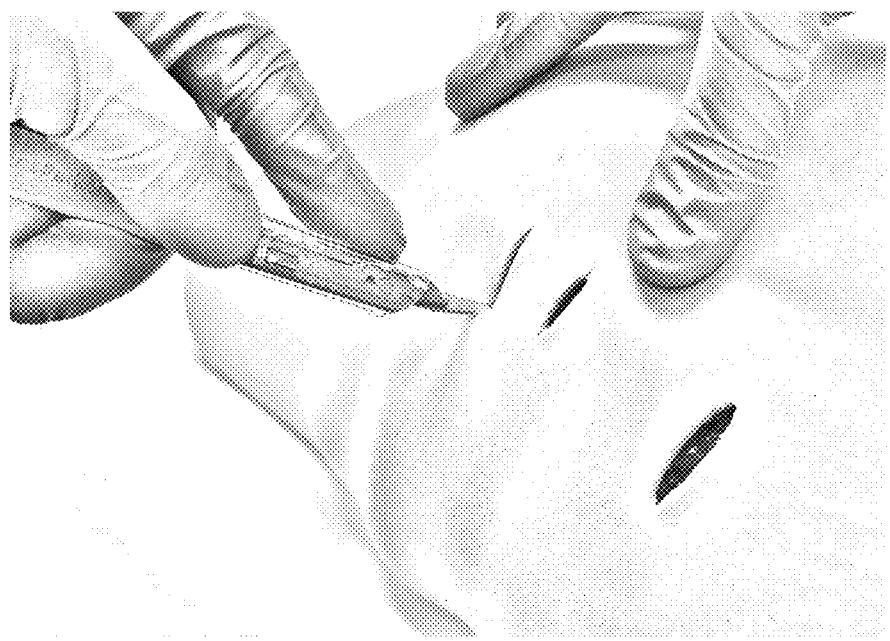
FIG. 29—An exemplary embodiment of a method of using the self-supporting wearable device during performance of opening of a surgical cut in the simulated skin layer with a scalpel, which can be performed when the device is worn by a user or manikin or placed on a surface.

FIG. 29 shows an exemplary embodiment of a method of using the self-supporting wearable device during performance of opening of a surgical cut in the simulated skin layer with a scalpel, which can be performed when the device is worn by a user or manikin or placed on a surface.

Figure 30:
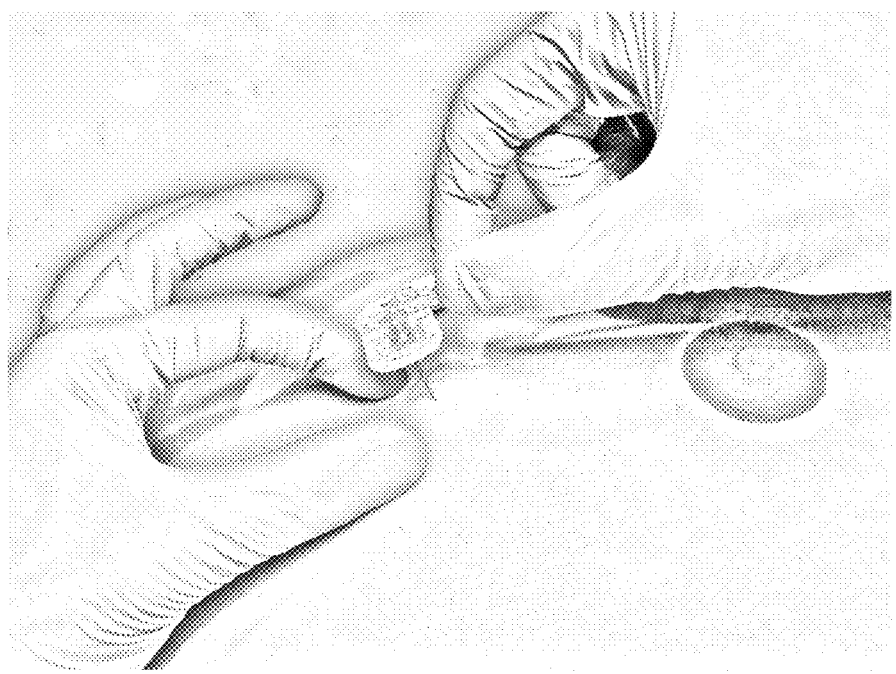
FIG. 30—An exemplary embodiment of a method of using the self-supporting wearable device during performance of accessing and/or care of an implanted chest port, which can be performed when the device is worn by a user or manikin or placed on a surface.

FIG. 30 shows an exemplary embodiment of a method of using the self-supporting wearable device during performance of accessing and/or care of an implanted chest port, which can be performed when the device is worn by a user or manikin or placed on a surface.

Figure 31:
FIG. 31—An exemplary embodiment of a method of using the self-supporting wearable device during performance of an exemplary injection or catheterizations, such as intramuscular and subcutaneous injections and the placement of a paracentesis catheter, which can be performed when the device is worn by a user or manikin or placed on a surface.

FIG. 31 shows an exemplary embodiment of a method of using the self-supporting wearable device during performance of an exemplary injection or catheterizations, such as intramuscular and subcutaneous injections and the placement of a paracentesis catheter, which can be performed when the device is worn by a user or manikin or placed on a surface.

Figure 32:
FIG. 32—An exemplary embodiment of a method of using the self-supporting wearable device during performance of a needle cricothyrotomy and a left humeral head intraosseous cannulation on an exemplary embodiment of the self-supporting wearable device described herein that is optionally moulaged and optionally worn by a first user while a second user performs the procedure on the device while it is optionally being worn.

FIG. 32 shows an exemplary embodiment of a method of using the self-supporting wearable device during performance of a needle cricothyrotomy and a left humeral head intraosseous cannulation on an exemplary embodiment of the self-supporting wearable device described herein that is optionally moulaged and optionally worn by a first user while a second user performs the procedure on the device while it is optionally being worn.

Figure 33:
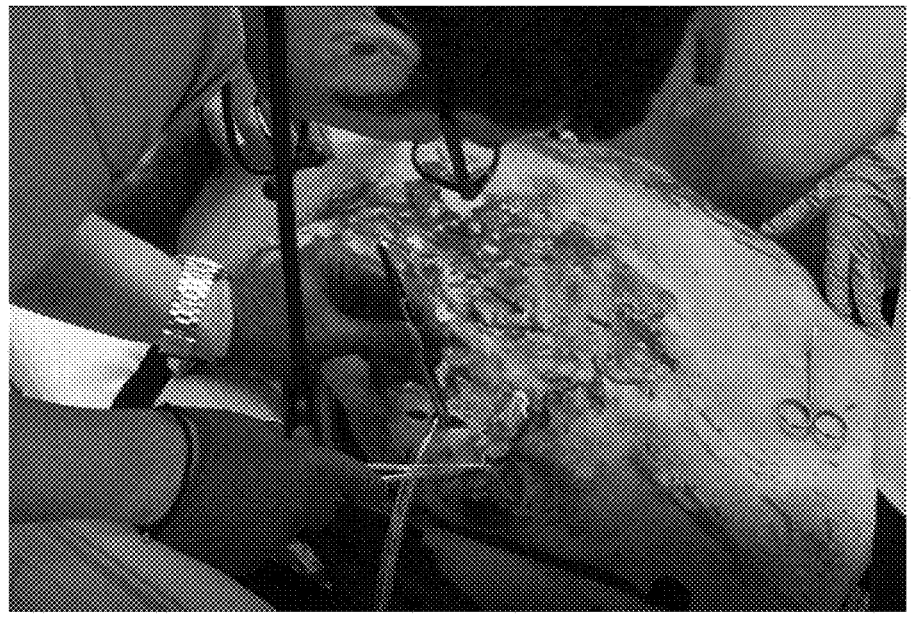
FIG. 33—An exemplary embodiment of a method of using the self-supporting wearable device during performance of a chest tube thoracostomy on an exemplary embodiment of the self-supporting wearable device described herein that is optionally moulaged and optionally worn by a first user while a second user performs the procedure on the device while it is optionally being worn.

FIG. 33 shows an exemplary embodiment of a method of using the self-supporting wearable device during performance of a chest tube thoracostomy on an exemplary embodiment of the self-supporting wearable device described herein that is optionally moulaged and optionally worn by a first user while a second user performs the procedure on the device while it is optionally being worn.

Figure 34:
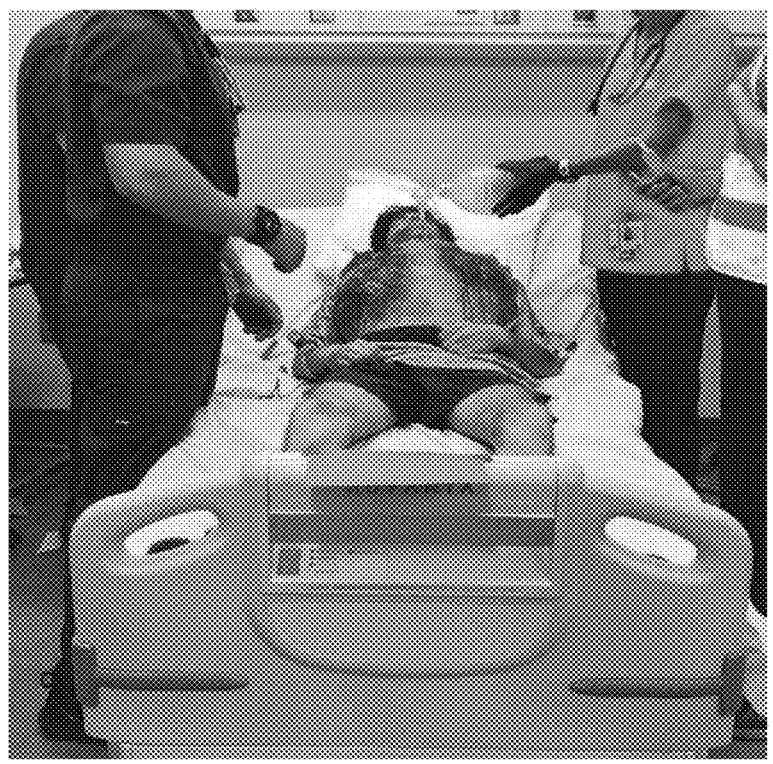
FIG. 34—An exemplary embodiment of a method of using the self-supporting wearable device during performance of a trauma simulation and treatment thereof on an exemplary embodiment of the self-supporting wearable device described herein that is optionally worn by a first user while one or more other users perform treatment of the simulated trauma while it is optionally being worn.

FIG. 34 shows an exemplary embodiment of a method of using the self-supporting wearable device during performance of a trauma simulation and treatment thereof on an exemplary embodiment of the self-supporting wearable device described herein that is optionally worn by a first user while one or more other users perform treatment of the simulated trauma while it is optionally being worn.

Further embodiments are illustrated in the following Examples which are given for illustrative purposes only and are not intended to limit the scope of the invention.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1—Wearable Training Device

As can be demonstrated by this Example and as shown in, for example, FIGS. 3, 15, 22-34, the wearable device can be a single functional unit designed to replicate the anatomical look and feel of the anterior male or female human torso and to simulate multiple traumatic injuries. In its complete form, the device has no detachable parts except for technical maintenance, repair, or replacement. The device comprises of multiple layers of silicone rubber, polyurethane foam, fabrics, hard and soft plastics, adhesives, and various screws, nuts, bolts, cable ties, and connectors made from different textiles and materials. Regarding usability, the device is designed to either lay sturdily on a horizontal surface if used as a tabletop procedural skills trainer or fit snugly and comfortably over the neck, shoulders, chest, and abdomen if worn by a person or manikin.

The external layer serves as a simulated skin covering of a human anterior torso. It is composed of silicone rubber of different colors, densities, and thicknesses with embedded fabric layer(s) that simulates human epidermal, dermal, subcutaneous, and muscle layers, anatomy, and variations. The external layer is stretchable, pliable, cuttable, repairable, and capable of accepting multiple forms of moulage makeup in order to simulate anatomic variation and different blunt and penetrating injuries.

The middle portion can be formed of molded plastics, resins, silicone rubbers, polyurethane foam, composite materials, or a combination thereof formed in the shape of a human male or female anterior torso. Attached to the middle layer are various components designed to simulate the human anatomy, such as a larynx, humeri, clavicles, sternum, ribs, muscle, adipose, and connective tissue. Each of these components are also made from molded plastics, resins, silicone rubbers, polyurethane foam, or composite materials and attached to the simulated torso form by various screws, nuts, bolts, cable ties, and connectors made from different textiles and materials.

The external portion is stretched over, wrapped around, and connected to the middle layer of the device using buttons, hooks, snaps, compression fittings, fasteners, or other various connectors. Depending on the injury type, patient simulation or training objectives, various moulage products, simulated anatomical items or foreign bodies can be placed between the external and middle layer to obtain the desired effect.

The internal portion is composed of molded plastics, resins, silicone rubbers or composite materials formed in the shape of a human male or female anterior torso. It is designed to fit snugly inside the middle layer and protect a person's neck, shoulders, chest, and abdomen if worn, or to be a sturdy base for the device if used off the body as a tabletop procedural skills trainer. The internal layer also holds multiple fabric, synthetic, or hook-and-loop straps or similar which secures the device to a user or manikin if worn and serves as carrying handles for easier device transport. See e.g. FIGS. 6A-6B.

The internal and middle portions can compress and secure the external layer between them and are held together using buttons, nuts, bolts, screws, hooks, snaps, straps, or other various connectors.

Various modifications and variations of the described methods, pharmaceutical compositions, and kits of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

What is claimed is:

1. A self-supporting wearable device comprising:
   an internal portion comprising:
      one or more formed layers, wherein each of the one or more formed layers comprises a material independently selected from the group consisting of: a plastic, a resin, a silicone rubber, or a composite material, wherein the one or more formed layers are formed in the shape of a ventral portion of a human torso,
      wherein the internal portion is configured to contact a torso of a person or a manikin when optionally worn by the person or the manikin,
   a middle portion comprising:
      one or more formed layers, wherein each of the one or more formed layers comprises a material independently selected from the group consisting of: a plastic, a resin, a silicone rubber, a polyurethane foam, or a composite material, wherein the one or more formed layers are formed in the shape of a ventral portion of a human torso;
      one or more simulated anatomical parts of a human torso coupled to one of the one or more formed layers of the middle portion; and
   an outer simulated skin, wherein the outer simulated skin is stretched over the middle portion such that the outer simulated skin assumes the shape formed from the middle portion;
   wherein the middle portion is sandwiched between and coupled to the outer simulated skin and the internal portion and
   wherein the internal portion is configured to support the middle portion and the outer simulated skin such that the wearable device is self-supporting such that it is configured for use as a trainer when not optionally worn by the person or the manikin.

2. The wearable self-supporting device of claim 1, further comprising one or more fastening members configured to couple the wearable self-supporting device to the torso of a user when optionally worn during use, wherein the one or more fastening members are coupled to the internal portion, the middle portion, the outer simulated skin, or a combination thereof.

3. The wearable self-supporting device of claim 1, wherein the simulated skin comprises a silicone rubber embedded with fabric.

4. The wearable self-supporting device of claim 1, wherein the simulated skin comprises a plurality of layers, wherein at least one layer comprises a fabric or a silicone rubber embedded with fabric.

5. The wearable self-supporting device of claim 4, wherein at least one layer comprises a fabric and at least one other layer comprises a silicone rubber, wherein the at least one layer comprising fabric and the at least one layer comprising silicone are attached to each other.

6. The wearable self-supporting device of claim 4, wherein each additional layer of the plurality of layers comprises a material independently selected from the group consisting of a polyurethane foam, silicone rubber, or a combination thereof.

7. The wearable self-supporting device of claim 4, wherein the plurality of layers simulate human epidermal tissue, human dermal tissue, subcutaneous tissue, adipose tissue, muscle tissue, or a combination thereof.

8. The wearable self-supporting device of claim 1, wherein the outer simulated skin is repairable.

9. The wearable self-supporting device of claim 1, wherein the one or more simulated anatomical parts are non-organ simulated anatomical parts.

10. The wearable self-supporting device of claim 1, wherein the one or more simulated anatomical parts are selected from a larynx, one or more humeri, one or more clavicles, sternum, one or more ribs, connective tissue, and a combination thereof.

11. The wearable self-supporting device of claim 1, wherein at least one of the one or more simulated anatomical parts is a simulated pericardium.

12. The wearable self-supporting device of claim 1, wherein the total weight of the wearable self-supporting device is less than about 10 lbs.

13. The wearable self-supporting device of claim 1, wherein the middle portion comprises 1-10 formed layers.

14. The wearable self-supporting device of claim 1, wherein the internal portion comprises 1-10 formed layers.

15. The wearable self-supporting device of claim 1, wherein the wearable self-supporting device is configured to cover a neck, one or more shoulders, a chest, an abdomen region, or a combination thereof of an optional user.

16. A method of using the wearable self-supporting device of claim 1, the method comprising:
   performing a simulated medical procedure on the wearable self-supporting device.

17. The method of claim 16, further comprising securing the device to a torso of a human or manikin or positioning the device on a surface with the outer simulated skin in facing away from the surface.

18. The method of claim 16, wherein the medical procedure is a cricothyrotomy, intraosseous cannulation of bilateral humeral heads, intraosseous cannulation of the sternum, intramuscular injections, subcutaneous injections, chest tube thoracostomy at multiple bilateral rib interspaces, laceration repair, abscess incision and drainage, hematoma evacuation, foreign body and impalement stabilization and removal, puncture/abrasions/avulsion wound care, chest needle decompression at multiple bilateral rib interspaces, pericardiocentesis, paracentesis, escharotomy, chest port access and care, or a combination thereof.

19. The method of claim 16, wherein performing a simulated medical procedure comprises applying a pressure one or more times in one or more locations on the self-supporting wearable device.

20. The method of claim 16, wherein performing a simulated medical procedure comprises making one or more incisions through at least one or more layers of the outer simulated skin.

* * * * *